(12) United States Patent
Duan et al.

(10) Patent No.: US 11,854,973 B2
(45) Date of Patent: Dec. 26, 2023

(54) SEMICONDUCTOR DEVICE WITH REDUCED RESISTANCE AND METHOD FOR MANUFACTURING THE SAME

(71) Applicant: TAIWAN SEMICONDUCTOR MANUFACTURING COMPANY, LTD., Hsinchu (TW)

(72) Inventors: Fei Fan Duan, Hsinchu (TW); Fong-yuan Chang, Hsinchu (TW); Chi-Yu Lu, Hsinchu (TW); Po-Hsiang Huang, Hsinchu (TW); Chih-Liang Chen, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 172 days.

(21) Appl. No.: 17/389,141

(22) Filed: Jul. 29, 2021

(65) Prior Publication Data
US 2022/0359392 A1 Nov. 10, 2022

Related U.S. Application Data

(60) Provisional application No. 63/192,696, filed on May 25, 2021, provisional application No. 63/185,802, filed on May 7, 2021.

(51) Int. Cl.
*H01L 23/528* (2006.01)
*H01L 23/522* (2006.01)
(Continued)

(52) U.S. Cl.
CPC ........ *H01L 23/5283* (2013.01); *G06F 30/398* (2020.01); *H01L 23/5226* (2013.01);
(Continued)

(58) Field of Classification Search
CPC ............. H01L 23/5283; H01L 23/5226; H01L 23/53209; G06F 30/398; G06F 2119/12; G03F 1/36
(Continued)

(56) References Cited

U.S. PATENT DOCUMENTS

| 6,522,004 B1 | 2/2003 | Higuchi |
| 7,260,442 B2 | 8/2007 | Hwang et al. |

(Continued)

FOREIGN PATENT DOCUMENTS

| DE | 60015006 | 6/2005 |
| DE | 102016212796 | 1/2017 |
| TW | 201933616 | 8/2019 |

OTHER PUBLICATIONS

Office Action dated May 8, 2022 for corresponding case No. DE 10 2021 120 078.4. (p. 1).

*Primary Examiner* — Tu-Tu V Ho
(74) *Attorney, Agent, or Firm* — Hauptman Ham, LLP

(57) ABSTRACT

A semiconductor device and a method of manufacturing the same are provided. The semiconductor device includes a first conductive pattern on a substrate, a second conductive pattern above the first conductive pattern, and a third conductive pattern above the first conductive pattern, all extending along a first direction. The first conductive pattern is electrically connected in parallel to the second conductive pattern and the third conductive pattern.

20 Claims, 20 Drawing Sheets

(51) Int. Cl.
*G06F 30/398* (2020.01)
*G06F 119/12* (2020.01)
*H01L 23/532* (2006.01)
*G03F 1/36* (2012.01)

(52) U.S. Cl.
CPC ............ *G03F 1/36* (2013.01); *G06F 2119/12* (2020.01); *H01L 23/53209* (2013.01)

(58) Field of Classification Search
USPC ........................................................ 257/774
See application file for complete search history.

(56) References Cited

U.S. PATENT DOCUMENTS

| | | |
|---|---|---|
| 9,256,709 B2 | 2/2016 | Yu et al. |
| 9,799,604 B2 | 10/2017 | Byun |
| 2004/0092124 A1 | 5/2004 | Suzuki et al. |
| 2006/0221531 A1 | 10/2006 | Nagata |
| 2010/0097875 A1 | 4/2010 | Vinke et al. |
| 2014/0040838 A1 | 2/2014 | Liu et al. |
| 2015/0278429 A1 | 10/2015 | Chang |
| 2015/0357327 A1* | 12/2015 | Liaw ..................... G11C 5/063 257/390 |
| 2019/0333853 A1* | 10/2019 | Kim ........................ H01L 23/50 |
| 2020/0035560 A1 | 1/2020 | Block et al. |

\* cited by examiner

SEMICONDUCTOR DEVICE WITH REDUCED RESISTANCE AND METHOD FOR MANUFACTURING THE SAME

PRIORITY CLAIM AND CROSS REFERENCE

This application claims the priority of U.S. Provisional Application No. 63/185,802, filed May 7, 2021, and U.S. Provisional Application No. 63/192,696, filed May 25, 2021, which are herein incorporated by reference in their entireties.

BACKGROUND

The present disclosure relates, in general, to semiconductor devices and methods for manufacturing the same. Specifically, the present disclosure relates to semiconductor devices with reduced resistance, and method for manufacturing the same.

A semiconductor structure may include numerous circuits electrically coupled by conductive metal interconnects and lines. The circuits may be derived from standard cells. A standard cell may include transistors or inverters. As technology progresses, demands for operating speed of semiconductor devices increase. Historically, semiconductor devices with higher resistance suffer a decrease in operating speeds. For this reason, research has been carried out to reduce resistance during layout design of a standard cell.

BRIEF DESCRIPTION OF THE DRAWINGS

Aspects of the embodiments of the present disclosure are best understood from the following detailed description when read with the accompanying figures. It should be noted that, in accordance with the standard practice in the industry, various structures are not drawn to scale. In fact, the dimensions of the various structures may be arbitrarily increased or reduced for clarity of discussion.

DETAILED DESCRIPTION

Figure 1A:
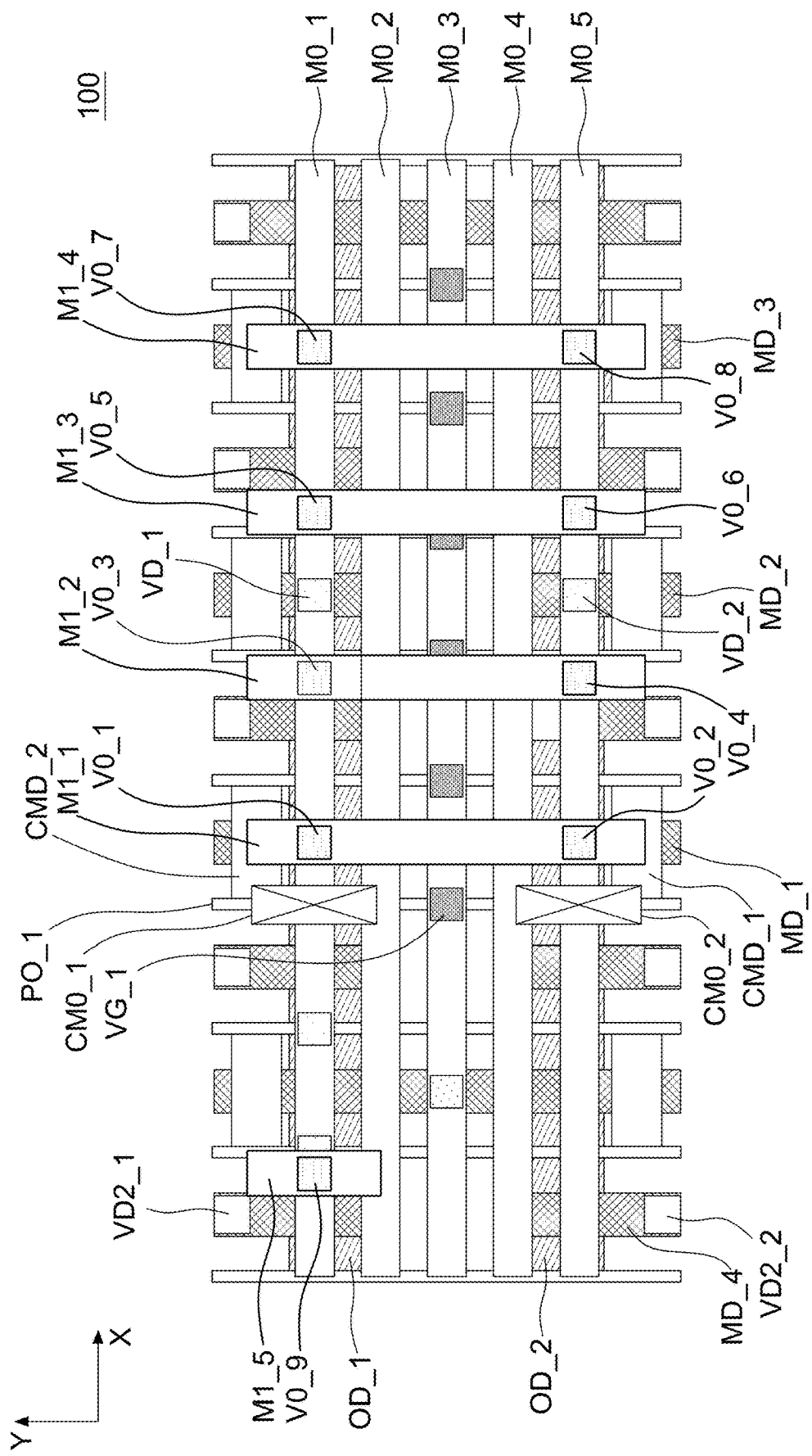
FIG. 1A is a top view of a semiconductor layout, in accordance with some embodiments of the present disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, although terms such as "first," "second" and "third" describe various elements, components, regions, layers and/or sections, these elements, components, regions, layers and/or sections should not be limited by these terms. These terms may only be used to distinguish one element, component, region, layer or section from another. Terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the terms "substantially," "approximately" and "about" generally mean within a value or range that can be contemplated by people having ordinary skill in the art. Alternatively, the terms "substantially," "approximately" and "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

FIGS. 1A-7 and 9 are diagrams of respective IC devices, in accordance with some embodiments. Each diagram of FIGS. 1A-7 represents both an IC device embodiment and an IC layout diagram embodiment usable in a manufacturing process as part of defining the features of the corresponding IC device.

In some embodiments, the IC layout diagram is usable in a method executed using an IC layout diagram generation system 1000 discussed below with respect to FIG. 10 and/or an IC manufacturing flow associated with IC manufacturing system 1100 discussed below with respect to FIG. 11, as part of defining one or more features of the corresponding IC device. In some embodiments, an IC layout diagram is stored in an IC design storage medium such as an IC design storage 1007 discussed below with respect to FIG. 10.

FIG. 1A illustrates a top view of a semiconductor layout, in accordance with some embodiments of the present disclosure.

FIG. 1A shows a layout 100. The layout 100 can correspond to an electrical device. The layout 100 can correspond to a semiconductor device. The layout 100 can correspond to a logic semiconductor structure. The layout 100 can correspond to a system of integrated circuits (IC). The layout 100 includes active regions OD_1 and OD_2 extending along an x-axis, a plurality of bottom conductive patterns (e.g., MD_1, MD_2, MD_3, and MD_4) extending along a y-axis, a plurality of poly-material patterns (e.g., PO_1) extending along a y-axis, a plurality of middle conductive patterns (e.g., M0_1, M0_2, M0_3, M0_4, and M0_5) extending along an x-axis, and a plurality of top conductive patterns (e.g., M1_1, M1_2, M1_3, M1_4, and M1_5) extending along a y-axis.

The modifiers "top," "middle," and "bottom" are used to represent the structural relationships of these conductive patterns of different groups. The top conductive patterns (e.g., M1_1, M1_2, M1_3, M1_4, and M1_5) are disposed above the middle conductive patterns (e.g., M0_1, M0_2, M0_3, M0_4, and M0_5). The middle conductive patterns (e.g., M0_1, M0_2, M0_3, M0_4, and M0_5) are disposed above the bottom conductive patterns (e.g., MD_1, MD_2, MD_3, and MD_4). The layout 100 may further include, while not depicted in FIG. 1A, conductive patterns above the top conductive patterns M1_1, M1_2, M1_3, M1_4, and M1_5.

The active region OD_1 is disposed parallel to the active region OD_2. The active regions OD_1 and OD_2 are spaced apart from each other. The active region OD_1 can be a p-type active region and the active region OD_2 can be an n-type active region. In some embodiments, the active region OD_1 is an n-type active region and the active region OD_2 is a p-type active region.

The plurality of bottom conductive patterns (e.g., MD_1, MD_2, MD_3, and MD_4) are disposed parallel to each other. The plurality of bottom conductive patterns are spaced apart from each other. The bottom conductive patterns include any type of suitable conductive materials. In some embodiments, the bottom conductive patterns include conductive materials, such as metal, for example, copper (Cu), tungsten (W), gold (Au), cobalt (Co), silver (Ag), or a combination thereof. In some embodiments, the bottom conductive patterns include conductive materials such as metal alloys.

The plurality of poly-material patterns (e.g., PO_1) are disposed parallel to each other. The plurality of poly-material patterns are spaced apart from each other. In some embodiments, the plurality of poly-material patterns can include metal conductive materials and/or non-metal conductive materials such as polysilicon. In some embodiments, a poly-material pattern, e.g., poly-material pattern PO_1, is referred to as a gate electrode that includes one or more conductive materials.

The plurality of middle conductive patterns (e.g., M0_1, M0_2, M0_3, M0_4, and M0_5) are disposed parallel to each other. The plurality of middle conductive patterns are spaced apart from each other. The middle conductive patterns include any type of suitable conductive materials. In some embodiments, the middle conductive patterns include conductive materials, such as metal, for example, copper (Cu), tungsten (W), gold (Au), cobalt (Co), silver (Ag), or a combination thereof. In some embodiments, the middle conductive patterns include conductive materials such as metal alloys.

The plurality of top conductive patterns (e.g., M1_1, M1_2, M1_3, M1_4, and M1_5) are disposed parallel to each other. The plurality of top conductive patterns are spaced apart from each other. The top conductive patterns include any type of suitable conductive materials. In some embodiments, the top conductive patterns include conductive materials, such as metal, for example, copper (Cu), tungsten (W), gold (Au), cobalt (Co), silver (Ag), or a combination thereof. In some embodiments, the top conductive patterns include conductive materials such as metal alloys.

The layout 100 includes isolation structures for separating a conductive pattern into electrically-isolated segments. The isolation structures can be referred to as a "cut" or a "cutter." For example, the isolation structure CM0_1 can be disposed to separate the middle conductive pattern M0_1 into two segments. In another example, the isolation structure CM0_2 can be disposed to separate the middle conductive pattern M0_5 into two segments. In yet another example, the isolation structures CMD_1 and CMD_2 can be disposed to separate the bottom conductive pattern MD_1 into segments that are electrically isolated from each other. The isolation structures include suitable non-conductive materials.

The layout 100 includes a plurality of conductive vias (e.g., VD2_1 and VD2_2) disposed in contact with the bottom conductive patterns. The conductive vias VD2_1 can be electrically connected to a power source, so as to receive a supply voltage, such as VDD. The conductive vias VD2_2 can be electrically connected to a power source, so as to receive a reference voltage, such as VSS.

The layout 100 includes a plurality of conductive vias (e.g., VD_1 and VD_2) disposed in contact with the bottom conductive patterns (e.g., MD_2). The conductive via VD_1 electrically connects the bottom conductive pattern MD_2 to the middle conductive pattern M0_1. The conductive via VD_2 electrically connects the bottom conductive pattern MD_2 to the middle conductive pattern M0_5.

The layout 100 includes a plurality of conductive vias (e.g., V0_1, V0_2, V0_3, V0_4, V0_5, V0_6, V0_7, V0_8, and V0_9) disposed in contact with the middle conductive patterns (e.g., M0_1 and M0_5). The conductive vias V0_1, V0_3, V0_5, V0_7, and V0_9 electrically connect the middle conductive pattern M0_1 to the respective top conductive patterns M1_1, M1_2, M1_3, M1_4, and M1_5. The conductive via V0_2, V0_4, V0_6, and V0_8 electrically connect the middle conductive pattern M0_5 to the respective top conductive patterns M1_1, M1_2, M1_3 and M1_4.

The layout 100 includes a plurality of conductive vias (e.g., VG_1) disposed in contact with the poly-material patterns (e.g., PO_1). The conductive vias VG_1 electrically connect the poly-material patterns PO_1 to the middle conductive pattern M0_3.

The top conductive pattern M1_5 can be configured to receive input signals. The top conductive pattern M1_5 can be an input stage of the layout 100. The top conductive patterns M1_1, M1_2, M1_3 and M1_4 can be configured to provide output signals. The top conductive patterns M1_1, M1_2, M1_3 and M1_4 can be an output stage of the layout 100.

The top conductive patterns M1_1, M1_2, M1_3, and M1_4 are electrically connected in parallel. The top conductive patterns M1_1, M1_2, M1_3, and M1_4 are electrically connected in parallel, through the conductive vias V0_1, V0_2, V0_3, V0_4, V0_5, V0_6, V0_7, and V0_8, and the middle conductive patterns M0_1 and M0_5.

The bottom conductive patterns MD_1, MD_2, and MD_3 are electrically connected in parallel. The bottom conductive patterns MD_1, MD_2, and MD_3 are electrically connected in parallel, through the conductive vias thereon (e.g., the conductive vias VD_1 and VD_2) and the middle conductive patterns M0_1 and M0_5. The conductive vias disposed in contact with the bottom conductive patterns MD_1 and MD_3 are not visible in FIG. 1A, being covered by the top conductive patterns M1_1 and M1_4, respectively.

The top conductive patterns M1_1, M1_2, M1_3, and M1_4 are electrically connected in parallel with the bottom conductive patterns MD_1, MD_2, and MD_3. For example, the bottom conductive pattern MD_3 is electrically connected in parallel with the top conductive patterns M1_1 and M1_3 through the conductive vias VD_1, VD_2, V0_3, V0_4, V0_5, and V0_6, and the middle conductive patterns M0_1 and M0_2.

The parallel connections of the bottom conductive patterns MD_1, MD_2, and MD_3 can reduce the overall resistance of the layout 100. The parallel connections of the bottom conductive patterns MD_1, MD_2, and MD_3 can increase the operating speed of a semiconductor device manufactured in accordance with the layout 100.

The parallel connections of the top conductive patterns M1_1, M1_2, M1_3, and M1_4 can reduce the overall resistance of the layout 100. The parallel connections of the top conductive patterns M1_1, M1_2, M1_3, and M1_4 can increase the operating speed of a semiconductor device manufactured in accordance with the layout 100.

The parallel connections of the conductive patterns MD_1, MD_2, and MD_3 and the top conductive patterns M1_1, M1_2, M1_3, and M1_4 can reduce the overall resistance of the layout 100. The parallel connections of the conductive patterns MD_1, MD_2, and MD_3 and the top conductive patterns M1_1, M1_2, M1_3, and M1_4 can increase the operating speed of a semiconductor device manufactured in accordance with the layout 100.

Figure 1B:
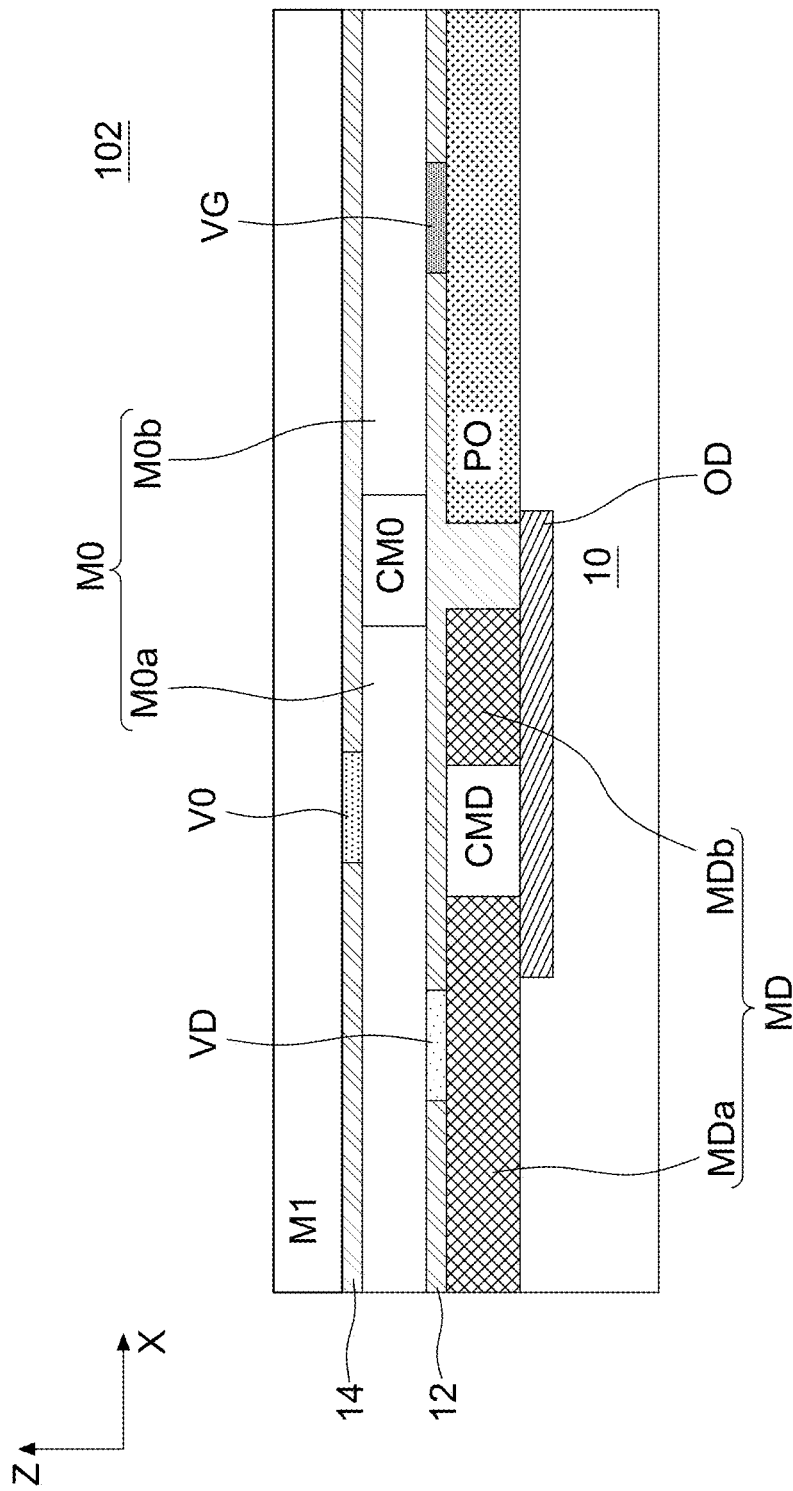
FIG. 1B is a cross-section of a semiconductor device, in accordance with some embodiments of the present disclosure.

FIG. 1B illustrates a cross-sectional view of a semiconductor device, in accordance with some embodiments of the present disclosure.

FIG. 1B is a cross-section of a semiconductor device 102. The purpose of FIG. 1B is to show a non-limiting example of a vertical architecture associated with the active region, bottom conductive pattern, the middle conductive pattern, the top conductive pattern, the poly-material pattern, the conductive vias, and the isolation structures that can be found in the layout 100 of FIG. 1A.

Referring to the non-limiting example of FIG. 1B, the semiconductor device 102 includes a substrate 10. In some embodiments, the substrate 10 includes a silicon substrate. Alternatively, the substrate 10 may include other elementary semiconductor materials such as, for example, germanium. The substrate 10 may also include a compound semiconductor such as silicon carbide, gallium arsenic, indium arsenide, or indium phosphide. The substrate 10 may include an alloy semiconductor such as silicon germanium, silicon germanium carbide, gallium arsenic phosphide, or gallium indium phosphide.

An active region OD is on the substrate 10. The active region OD can be embedded within the substrate 10. In some embodiments, the active region OD is an n-type active region. In some embodiments, the active region OD is a p-type active region.

The bottom conductive pattern MD is on the substrate 10. The bottom conductive pattern MD is in contact with the substrate 10. The poly-material pattern PO is disposed on the substrate 10. The poly-material pattern PO is in contact with the substrate 10. The bottom conductive pattern MD is spaced apart from the poly-material pattern PO by a gap. The bottom conductive pattern MD is separated by an isolation structure CMD. The isolation structure CMD separates the bottom conductive pattern MD into two electrically-isolated portions MDa and MDb.

The middle conductive pattern M0 is above the bottom conductive pattern MD and the poly-material pattern PO. The middle conductive pattern M0 is separated by an isolation structure CM0. The isolation structure CM0 separates the middle conductive pattern M0 into two electrically-isolated portions M0a and M0b. The top conductive pattern M1 is disposed above the middle conductive pattern M0.

The bottom conductive pattern MD is electrically connected to the middle conductive pattern M0 through the conductive via VD. The poly-material pattern PO is electrically connected to the middle conductive pattern M0 through the conductive via VG. The middle conductive pattern M0 is electrically connected to the top conductive pattern M1 through the conductive via V0.

A dielectric layer 12, also referred to as an intermetal dielectric layer 12 in some embodiments, is between the bottom conductive pattern MD and the middle conductive pattern M0 and between the poly-material pattern PO and the middle conductive pattern M0. A dielectric layer 14, also referred to as an intermetal dielectric layer 14 in some embodiments, is between the middle conductive pattern M0 and the top conductive pattern M1. Dielectric layers 12 and 14 isolate different conductive patterns.

Figure 1C:
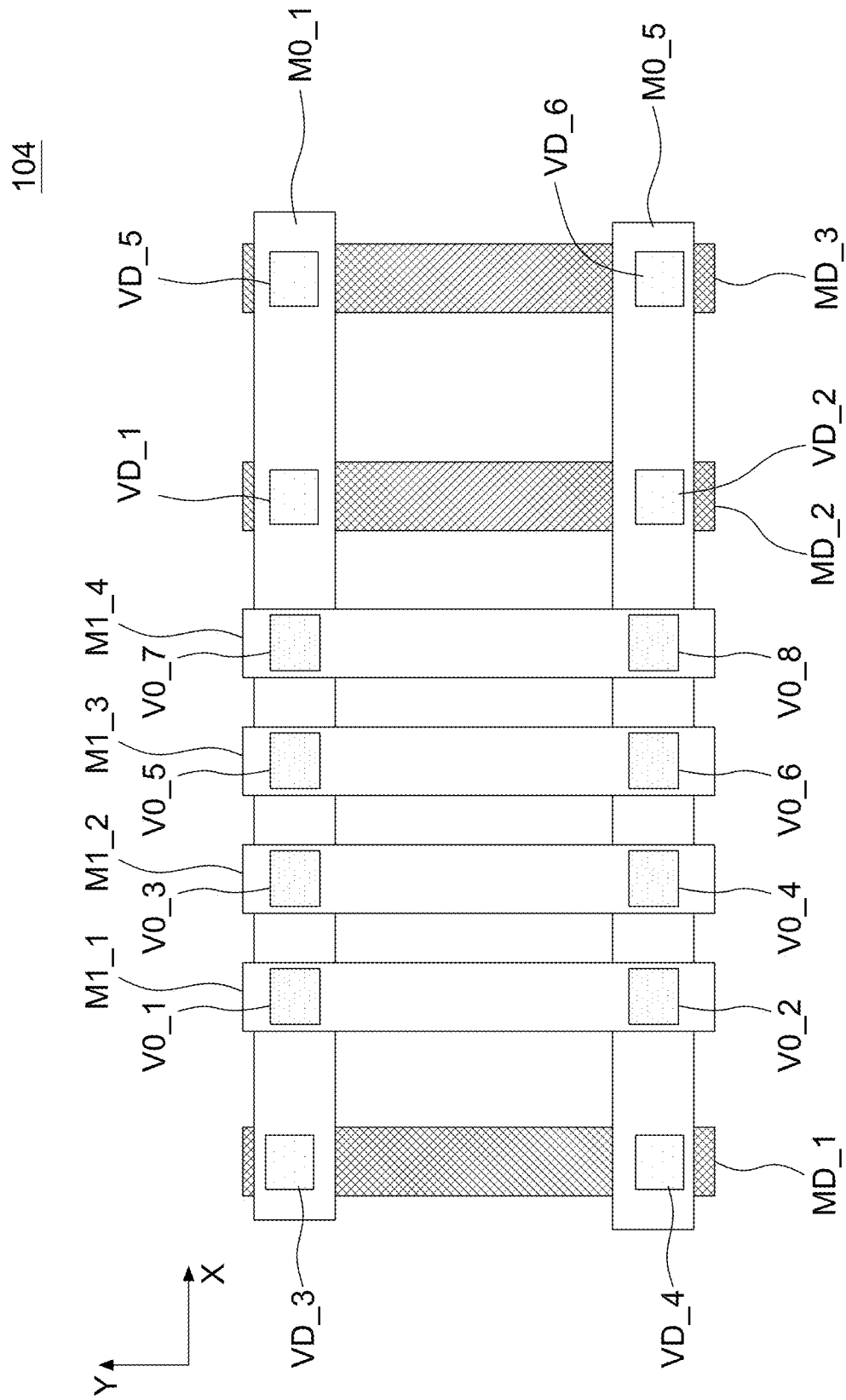
FIG. 1C is a top view of a semiconductor layout, in accordance with some embodiments of the present disclosure.

FIG. 1C illustrates a top view of a semiconductor layout, in accordance with some embodiments of the present disclosure.

FIG. 1C shows a layout 104. The layout 104 can correspond to a portion of the layout 100 of FIG. 1A. Specifically, the layout 104 corresponds to the output stage of the layout 100.

Referring to FIG. 1C, the top conductive patterns M1_1, M1_2, M1_3, and M1_4 are electrically connected in parallel with the bottom conductive patterns MD_1, MD_2, and MD_3. The top conductive patterns M1_1, M1_2, M1_3, and M1_4 are electrically connected in parallel with the bottom conductive patterns MD_1, MD_2, and MD_3 through the conductive vias V0_1 to V0_8, the conductive vias VD_1 to VD_6, and the middle conductive patterns M0_1 and M0_5.

The parallel connections of the conductive patterns MD_1, MD_2, and MD_3 and the top conductive patterns M1_1, M1_2, M1_3, and M1_4 can reduce the overall resistance and at the same time increase the operating speed of a semiconductor device.

Figure 2A:
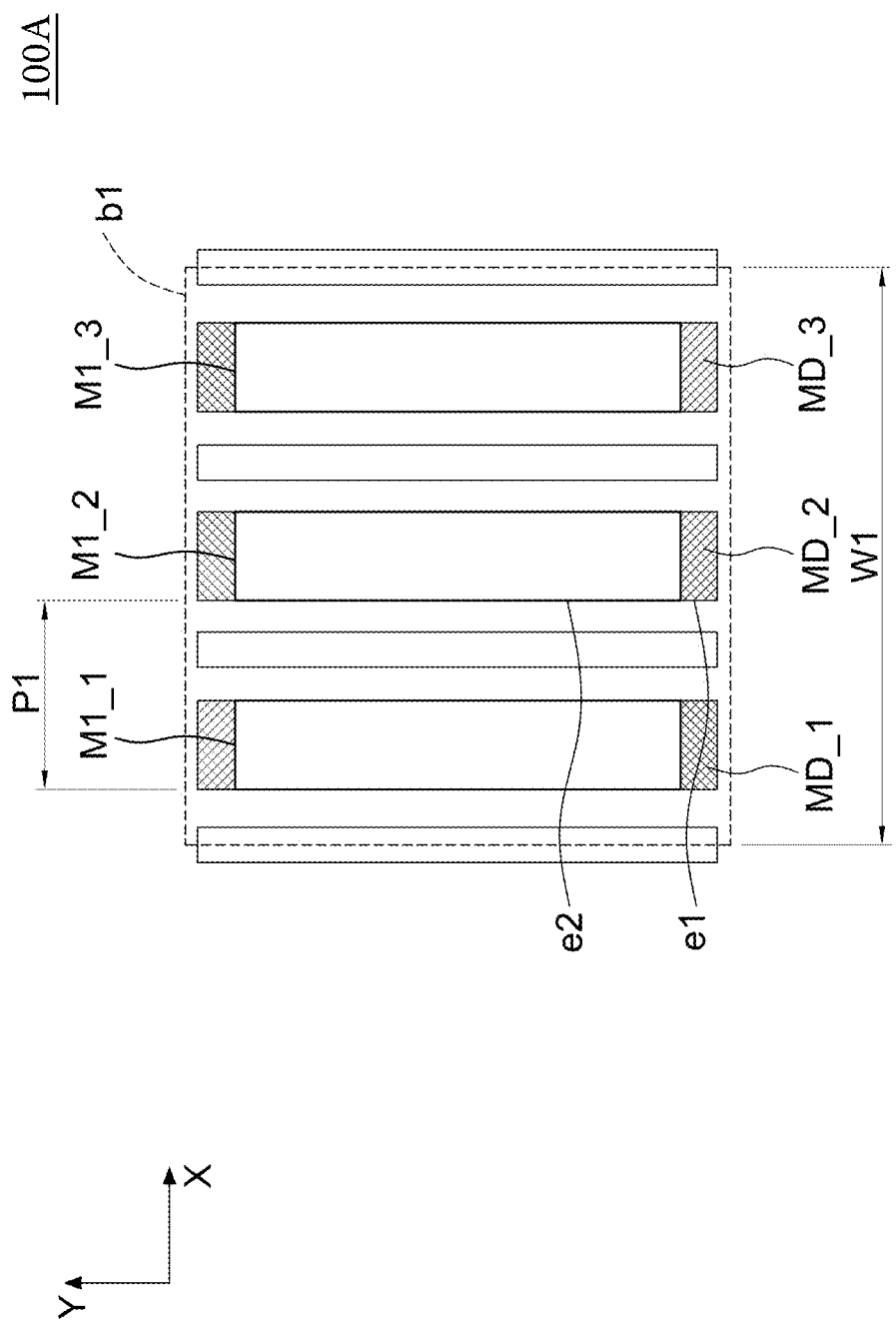
FIG. 2A is a top view of a semiconductor layout, in accordance with some embodiments of the present disclosure.

FIG. 2A illustrates a top view of a semiconductor layout, in accordance with some embodiments of the present disclosure.

FIG. 2A shows a layout 100A. The layout 100A illustrates a non-limiting example in which the bottom conductive patterns and the top conductive patterns are disposed within the cell boundary b1 of a single logic cell. In the layout 100A, three top conductive patterns are disposed within the cell boundary b1. In the layout 100A, the three top conductive patterns are electrically connected in parallel with the bottom conductive patterns.

The logic cell shown in FIG. 2A includes a width W1. In some embodiments, the width W1 of the logic cell is around 153 nanometers (nm). In other embodiments, the width W1 of the logic cell exceeds 153 nm. In yet other embodiments, the width W1 of the logic cell is less than 153 nm. The bottom conductive patterns MD_1, MD_2, and MD_3 are spaced apart from each other by a pitch P1. In some embodiments, the pitch P1 is around 51 nm. In other embodiments, the pitch P1 exceeds 51 nm. In other embodiments, the pitch P1 is less than 51 nm.

The top conductive pattern M1_1 is aligned with the bottom conductive pattern MD_1 in an x-axis. The top conductive pattern M1_2 is aligned with the bottom conductive pattern MD_2 in an x-axis. The top conductive pattern M1_3 is aligned with the bottom conductive pattern MD_3 in an x-axis.

Along an x-axis, edges of the top conductive pattern M1_1 are aligned with edges of the bottom conductive pattern MD_1. Along an x-axis, edges of the top conductive pattern M1_2 are aligned with edges of the bottom conductive pattern MD_2. Along an x-axis, edges of the top conductive pattern M1_3 are aligned with edges of the bottom conductive pattern MD_3.

For example, an edge e1 of the bottom conductive pattern MD_2 is aligned with the edge e2 of the top conductive pattern M1_2.

From a top down view, the top conductive pattern M1_1 covers a portion of the bottom conductive pattern MD_1, and exposes a portion of the bottom conductive pattern MD_1. From a top down view, the top conductive pattern M1_2 covers a portion of the bottom conductive pattern MD_2, and exposes a portion of the bottom conductive pattern MD_2. From a top down view, the top conductive pattern M1_3 covers a portion of the bottom conductive pattern MD_3, and exposes a portion of the bottom conductive pattern MD_3.

Figure 2B:
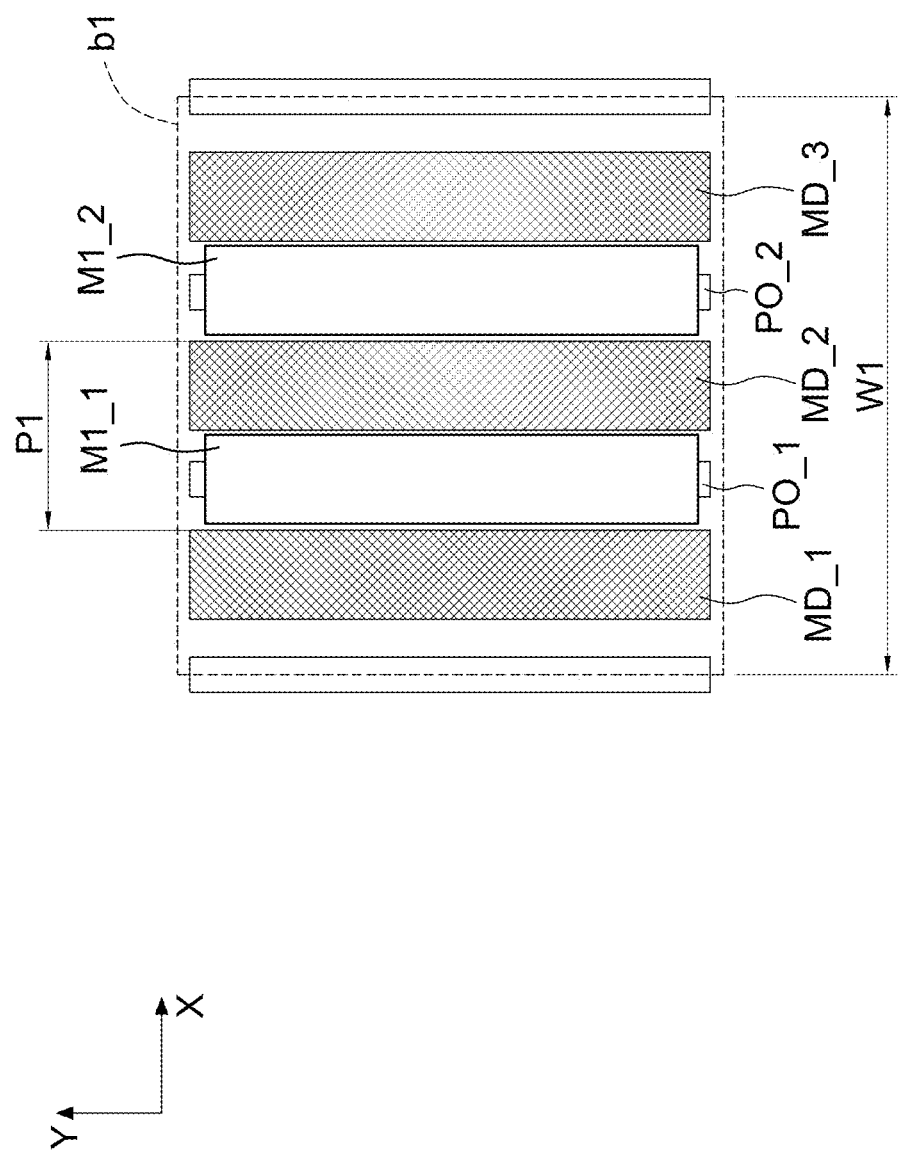
FIG. 2B is a top view of a semiconductor layout, in accordance with some embodiments of the present disclosure.

FIG. 2B shows a non-limiting example of a layout 100B in which the bottom conductive patterns and the top conductive patterns are disposed within the cell boundary b1 of a single logic cell. In the layout 100B, two top conductive patterns are disposed within the cell boundary b1. In the layout 100B, the two top conductive patterns are electrically connected in parallel with the bottom conductive patterns.

The logic cell shown in FIG. 2B includes width W1 and conductive patterns MD_1, MD_2, and MD_3 spaced apart from each other by pitch P1.

Along an x-axis, the top conductive pattern M1_1 is between the bottom conductive patterns MD_1 and MD_2. Along an x-axis, the top conductive pattern M1_2 is disposed between the bottom conductive patterns MD_2 and MD_3.

From a top down view, the top conductive pattern M1_1 covers a portion of the poly-material pattern PO_1, and exposes a portion of the poly-material pattern PO_1. From a top down view, the top conductive pattern M1_2 covers a portion of the poly-material pattern PO_2, and exposes a portion of the poly-material pattern PO_2.

Figure 2C:
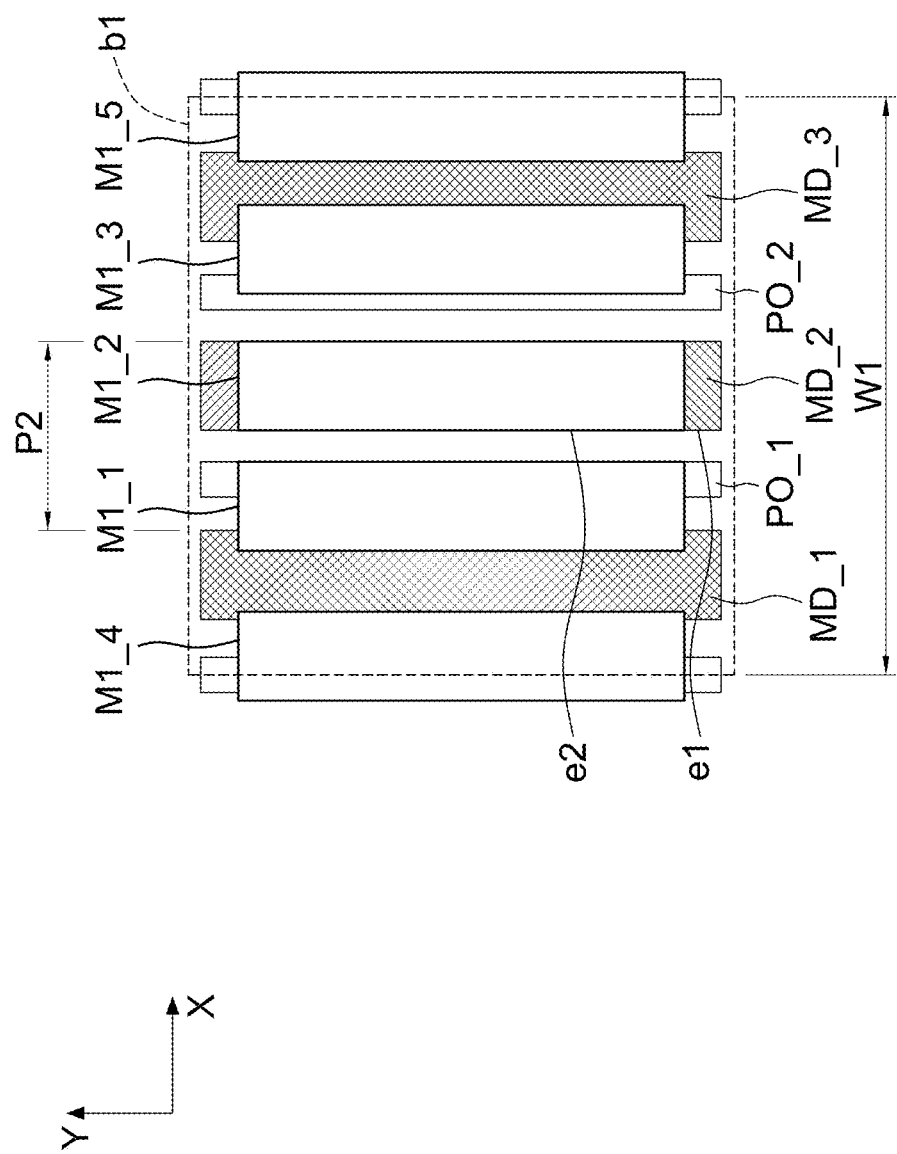
FIG. 2C is a top view of a semiconductor layout, in accordance with some embodiments of the present disclosure.

FIG. 2C shows a non-limiting example of a layout 100C in which the bottom conductive patterns and the top conductive patterns are within the cell boundary b1 of a single logic cell. In the layout 100C, three top conductive patterns are disposed within the cell boundary b1. In the layout 100C, the three top conductive patterns are electrically connected in parallel with the bottom conductive patterns.

The logic cell shown in FIG. 2C includes width W1. The bottom conductive patterns MD_1, MD_2, and MD_3 are spaced apart from each other by a pitch P2. In some embodiments, the pitch P2 is around 34 nm. In other embodiments, the pitch P2 exceeds 34 nm. In other embodiments, the pitch P2 is less than 34 nm.

From the top view, the top conductive pattern M1_1 overlaps a portion of the bottom conductive pattern MD_1 and a portion of the poly-material pattern PO_1. From the top view, the top conductive pattern M1_3 overlaps a portion of the bottom conductive pattern MD_3 and a portion of the poly-material pattern PO_2.

The top conductive pattern M1_2 is aligned with the bottom conductive pattern MD_2 along an x-axis. Along an x-axis, an edge e1 of the bottom conductive pattern MD_2 is aligned with an edge e2 of the top conductive pattern M1_2.

The layout 100C further includes the top conductive patterns M1_4 and M1_5. Because a portion of each of the top conductive patterns M1_4 and M1_5 is disposed outside the cell boundary b1, they are not included in a density calculation of top conductive pattern of the layout 100C.

Figure 2D:
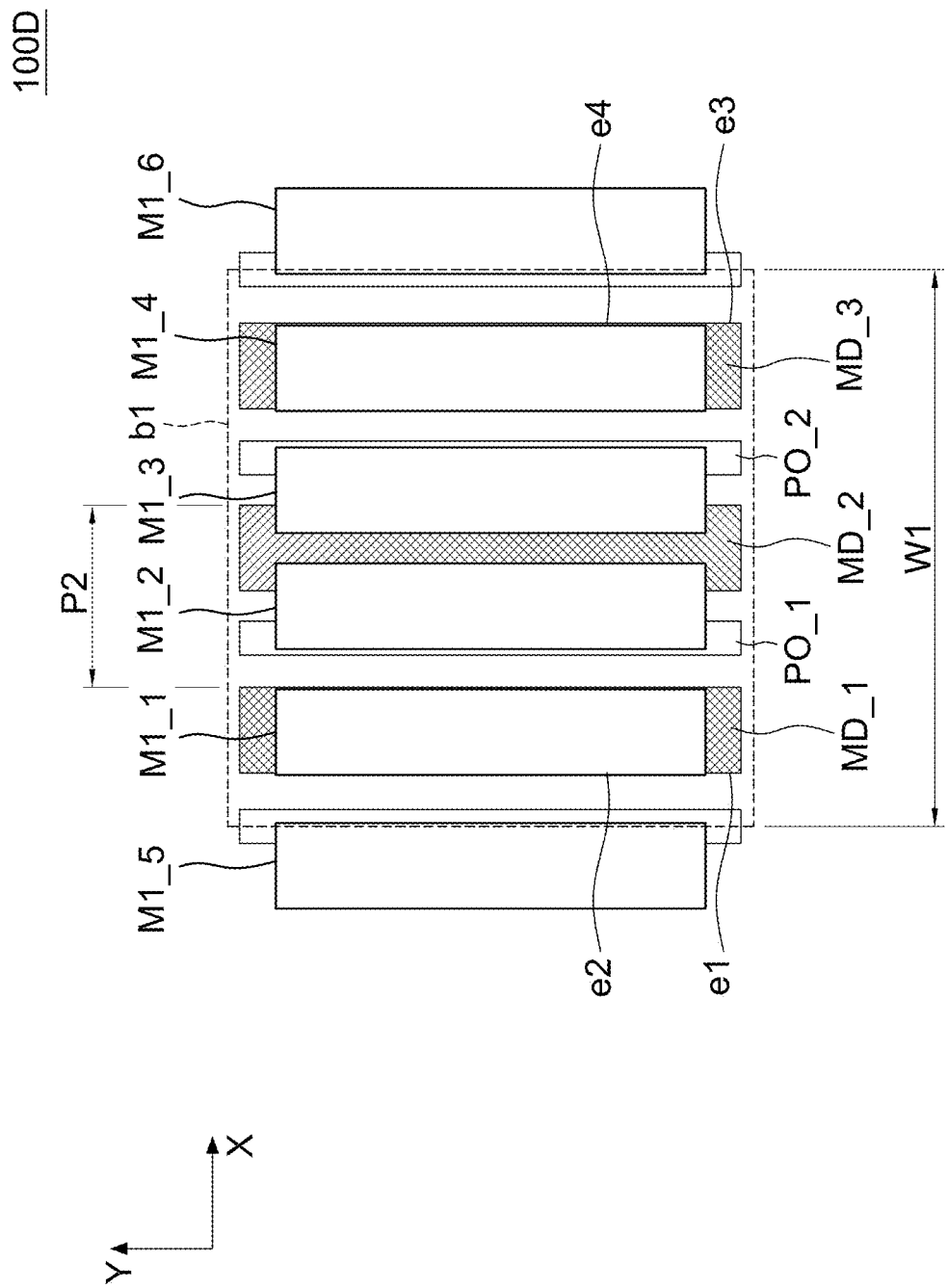
FIG. 2D is a top view of a semiconductor layout, in accordance with some embodiments of the present disclosure.

FIG. 2D shows a non-limiting example of a layout 100D in which the bottom conductive patterns and the top conductive patterns are within the cell boundary b1 of a single logic cell. In the layout 100D, four top conductive patterns are disposed within the cell boundary b1. In the layout 100D, the four top conductive patterns are electrically connected in parallel with the bottom conductive patterns.

The logic cell shown in FIG. 2D includes width W1 and bottom conductive patterns MD_1, MD_2, and MD_3 spaced apart from each other by pitch P2.

From a top down view, the top conductive pattern M1_2 overlaps a portion of the bottom conductive pattern MD_2 and a portion of the poly-material pattern PO_1. From a top down view, the top conductive pattern M1_3 overlaps a portion of the bottom conductive pattern MD_2 and a portion of the poly-material pattern PO_2.

The top conductive pattern M1_1 is aligned with the bottom conductive pattern MD_1 along an x-axis. Along an x-axis, an edge e1 of the bottom conductive pattern MD_1 is aligned with an edge e2 of the top conductive pattern M1_1.

The top conductive pattern M1_4 is aligned with the bottom conductive pattern MD_3 in an x-axis. Along an x-axis, an edge e3 of the bottom conductive pattern MD_3 is aligned with an edge e4 of the top conductive pattern M1_4.

The layout 100D further includes the top conductive patterns M1_5 and M1_6. Because a portion of each of the top conductive patterns M1_5 and M1_6 is outside the cell boundary b1, they are not included in the density calculation of top conductive pattern of the layout 100D.

Figure 3A:
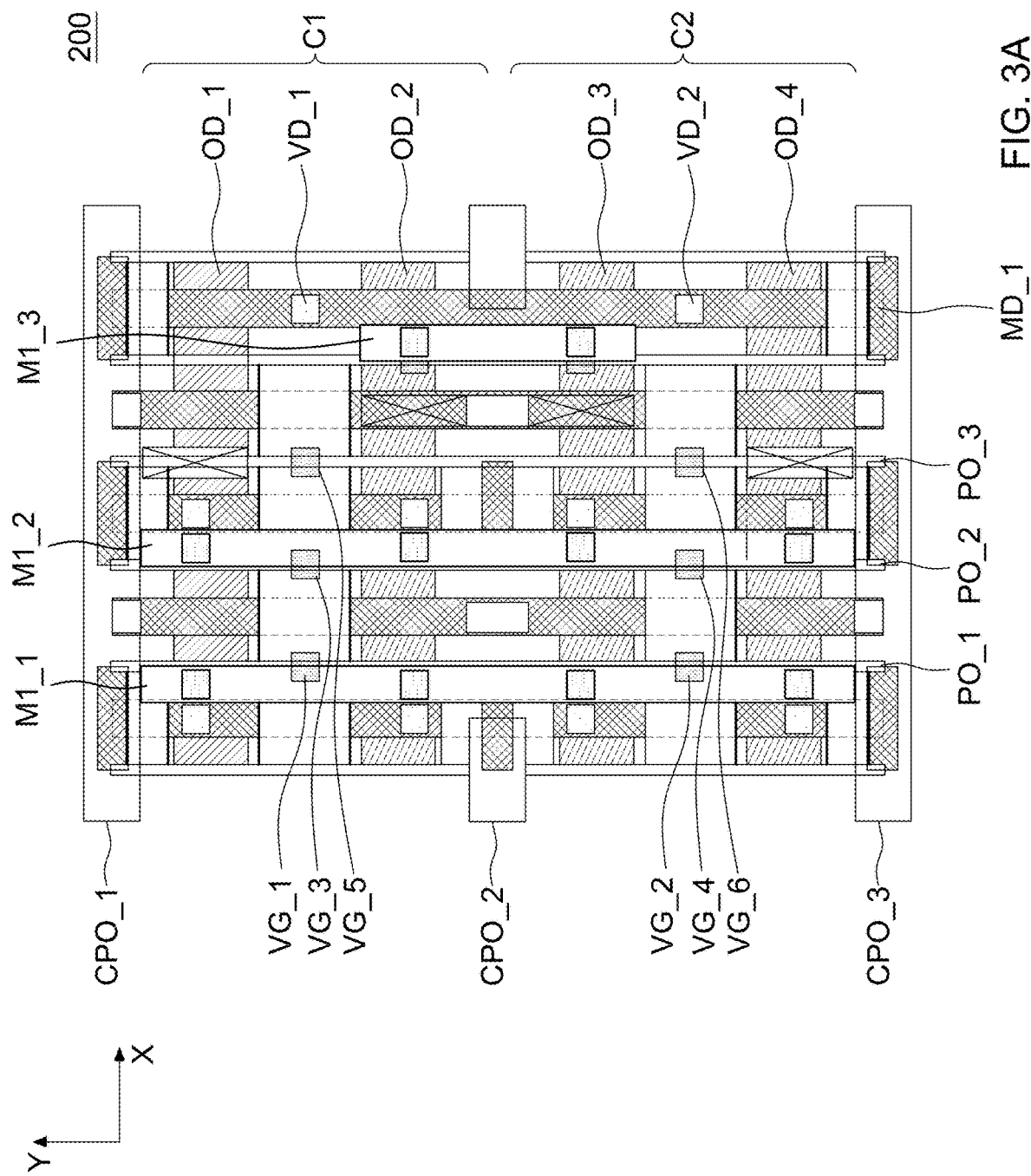
FIG. 3A is a top view of a semiconductor layout, in accordance with some embodiments of the present disclosure.

FIG. 3A illustrates a top view of a semiconductor layout, in accordance with some embodiments of the present disclosure.

FIG. 3A shows a layout 200. The layout 200 can correspond to an electrical device. The layout 200 can correspond to a semiconductor device. The layout 200 can correspond to a logic semiconductor structure. The layout 200 can correspond to a system of integrated circuits (IC).

The layout 200 includes active regions OD_1, OD_2, OD_3 and OD_4 extending along an x-axis, a plurality of bottom conductive patterns (e.g., MD_1) extending along a y-axis, a plurality of poly-material patterns (e.g., PO_1, PO_2, and PO_3) extending along a y-axis, a plurality of middle conductive patterns (not shown) extending along an x-axis, and a plurality of top conductive patterns (e.g., M1_1, M1_2, and M1_3) extending along a y-axis.

The layout 200 includes regions for cells C1 and C2. Cells C1 and C2 can each have a region of "single height," and the layout 200 can be referred to as a layout with a region of "double height." The layout 200 is designed using a "double height" scheme.

The layout 200 includes isolation structures for separating a poly-material pattern into segments that are electrically isolated. The isolation structures can be referred to as a "cut" or a "cutter." For example, the isolation structures CPO_1 and CPO_3 are disposed at the boundaries of the cells C1 and C2, so as to isolate the poly-material patterns (such as PO_1, PO_2, and PO_3) from other cells adjacent to the cells C1 and C2. The isolation structures include suitable non-conductive material.

In a general layout design, an additional isolation structure is disposed at the boundary between the cell C1 and C2. That is, in a general layout design, the isolation structure CPO_2 extends continuously from the left to the right so as to separate each of the poly-material patterns PO_1, PO_2, and PO_3 into two electrically-isolated segments. However, this is not the case for the embodiment shown in FIG. 3A.

In the layout 200 of FIG. 3A, the poly-material patterns PO_1, PO_2, and PO_3 are not divided by the isolation structure CPO_2. The poly-material patterns PO_1, PO_2, and PO_3 extend continuously from the cell C1 to the cell C2, across the boundary between the cell C1 to the cell C2.

The poly-material patterns PO_1, PO_2, and PO_3 are electrically connected in parallel. The poly-material patterns PO_1, PO_2, and PO_3 are electrically connected in parallel with the bottom conductive pattern MD_1. The poly-material patterns PO_1, PO_2, and PO_3 and the bottom conductive pattern MD_1 are electrically connected through the conductive vias VG_1, VG_3, VG_5, and VD_1, and a middle conductive pattern (not shown) extending along an x-axis. The poly-material patterns PO_1, PO_2, and PO_3 and the bottom conductive pattern MD_1 are electrically connected through the conductive vias VG_2, VG_4, VG_6, and VD_2, and a middle conductive pattern (not shown) extending along an x-axis.

The parallel connections of the poly-material patterns PO_1, PO_2, and PO_3 and the bottom conductive pattern MD_1 can reduce the overall resistance of the layout 200. The parallel connections of the poly-material patterns PO_1, PO_2, and PO_3 and the bottom conductive pattern MD_1 can increase the operating speed of a semiconductor device manufactured in accordance with the layout 200.

Figure 3B:
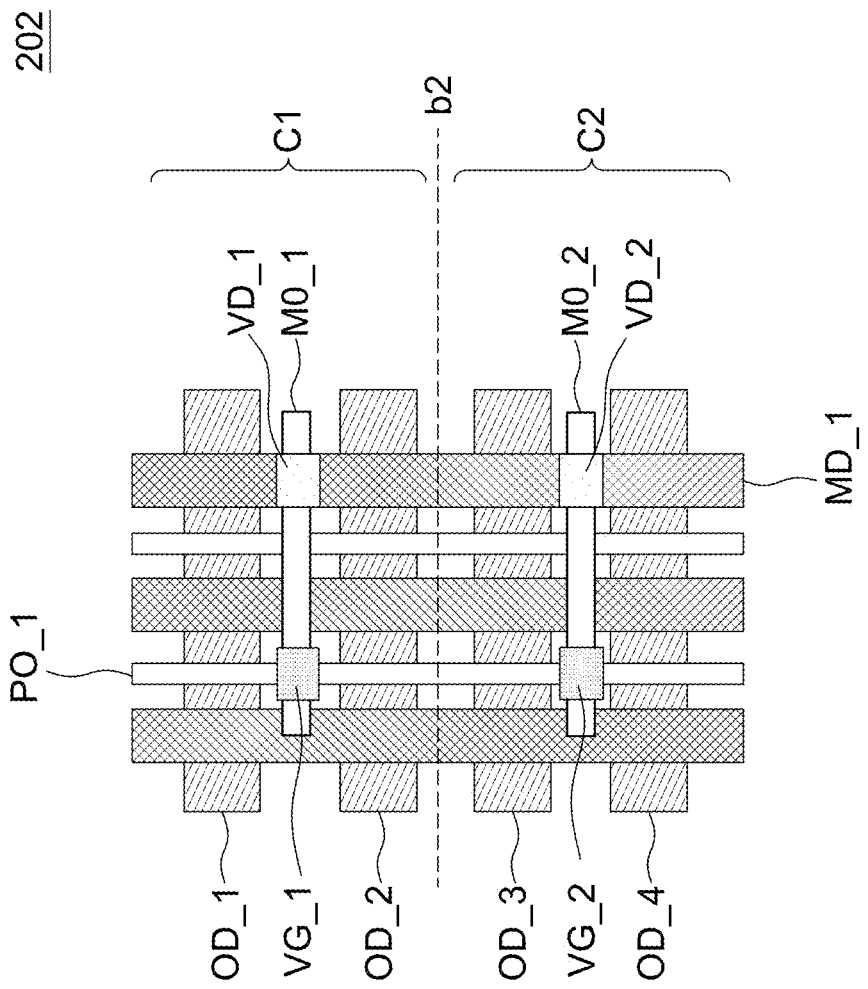
FIG. 3B is a top view of a semiconductor layout, in accordance with some embodiments of the present disclosure.

FIG. 3B illustrates a top view of a semiconductor layout, in accordance with some embodiments of the present disclosure.

FIG. 3B shows a layout 202. The layout 202 is a non-limiting example of a portion of the layout 200 of FIG. 3A. The layout 202 is a simplified schematic to show the electrical connections between the poly-material pattern and the bottom conductive pattern.

The layout 202 includes active regions OD_1, OD_2, OD_3 and OD_4 extending along an x-axis, bottom conductive patterns (e.g., MD_1) extending along a y-axis, poly-material patterns (e.g., PO_1) extending along a y-axis, and middle conductive patterns (e.g., M0_1, and M0_2) extending along an x-axis.

The poly-material pattern PO_1 extends continuously from the cell C1 to the cell C2, across the boundary b2 between the cells C1 and C2. The bottom conductive pattern MD_1 extends continuously from the cell C1 to the cell C2, across the boundary b2 between the cells C1 and C2.

The poly-material pattern PO_1 is electrically connected in parallel with the bottom conductive pattern MD_1. The poly-material pattern PO_1 is electrically connected to the bottom conductive pattern MD_1, through the conductive vias VG_1 and VD_1 and the middle conductive pattern M0_1. The poly-material pattern PO_1 is electrically connected to the bottom conductive pattern MD_1, through the conductive vias VG_2 and VD_2 and the middle conductive pattern M0_2.

In FIG. 3B, two active regions OD_2 and OD_3 are located between the conductive vias VG_1 and VG_2 (or between the middle conductive patterns M0_1 and M0_2). In some embodiments, more than two active regions are located between the conductive vias VG_1 and VG_2. In other embodiments, only one active region is located between the conductive vias VG_1 and VG_2.

Figure 4A:
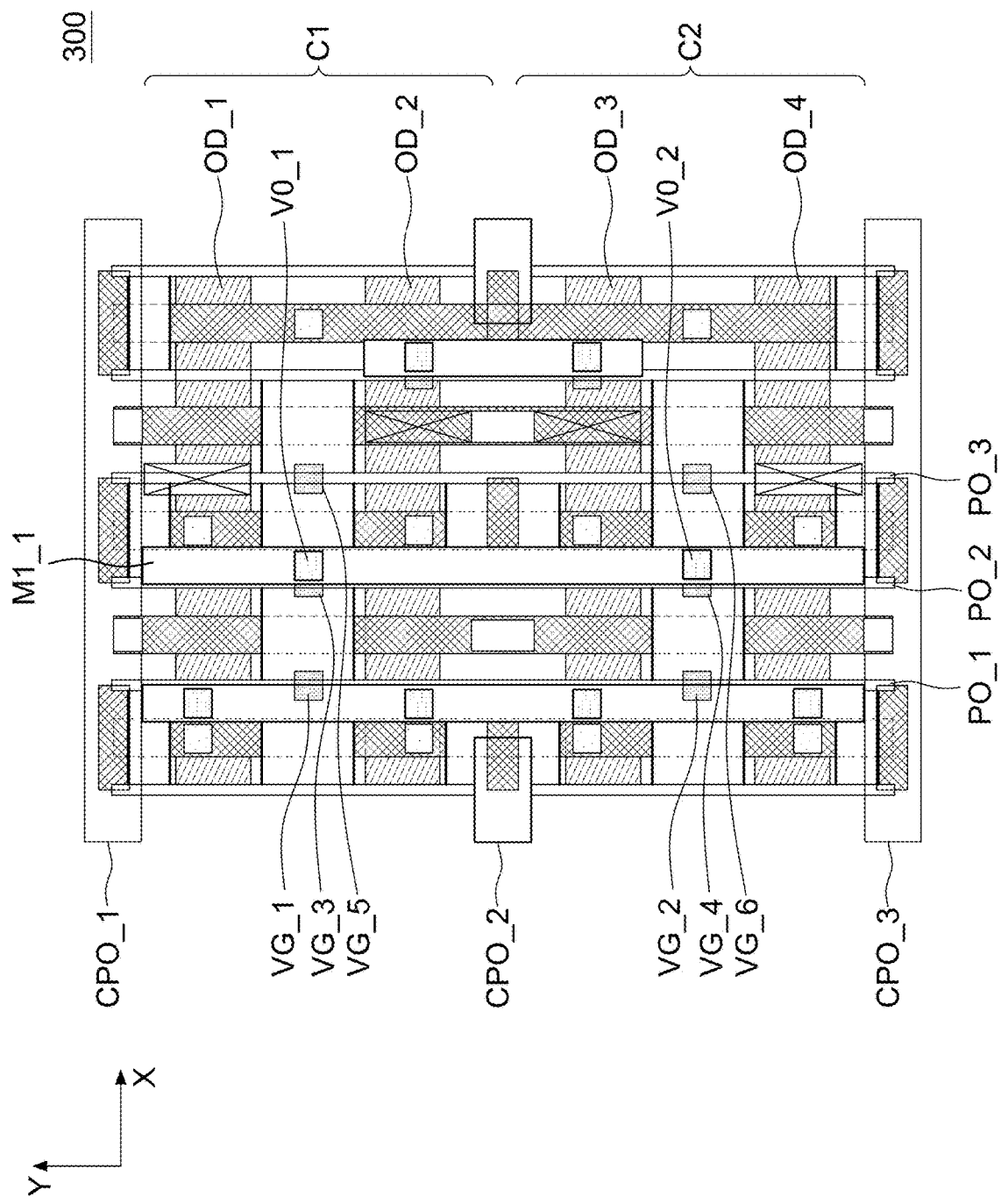
FIG. 4A is a top view of a semiconductor layout, in accordance with some embodiments of the present disclosure.

FIG. 4A illustrates a top view of a semiconductor layout, in accordance with some embodiments of the present disclosure.

FIG. 4A shows a layout 300. The layout 300 can correspond to an electrical device. The layout 300 can correspond to a semiconductor device. The layout 300 can correspond to a logic semiconductor structure. The layout 300 can correspond to a system of integrated circuits (IC).

The layout 300 includes active regions OD_1, OD_2, OD_3 and OD_4 extending along an x-axis, a plurality of bottom conductive patterns extending along a y-axis, a plurality of poly-material patterns (e.g., PO_1, PO_2, and PO_3) extending along a y-axis, a plurality of middle conductive patterns (not shown) extending along an x-axis, and a plurality of top conductive patterns (e.g., M1_1) extending along a y-axis.

The layout 300 includes regions for cells C1 and C2. Cells C1 and C2 can each has a region with "single height," and the layout 300 can be referred to as a layout with a region of "double height." The layout 300 is designed using a "double height" scheme.

The layout 300 includes isolation structures for separating a poly-material pattern into segments that are electrically isolated. The isolation structures CPO_1 and CPO_3 can be disposed at the boundaries of the cells C1 and C2, so as to isolate the poly-material patterns (such as PO_1, PO_2, and PO_3) from other cells adjacent to the cells C1 and C2. The isolation structures include suitable non-conductive materials.

In a general layout design, an additional isolation structure is disposed at the boundary between the cell C1 and C2. That is, in a general layout design, the isolation structure CPO_2 extends continuously from the left to the right so as to separate each of the poly-material patterns PO_1, PO_2, and PO_3 into two electrically-isolated segments. However, this is not the case for the embodiment shown in FIG. 4A.

In the layout 300 of FIG. 4A, the poly-material patterns PO_1, PO_2, and PO_3 are not divided by the isolation structure CPO_2. The poly-material patterns PO_1, PO_2, and PO_3 extend continuously from the cell C1 to the cell C2, across the boundary between the cell C1 to the cell C2.

The poly-material patterns PO_1, PO_2, and PO_3 are electrically connected in parallel. The poly-material patterns PO_1, PO_2, and PO_3 are electrically connected in parallel with the top conductive pattern M1_1. The poly-material patterns PO_1, PO_2, and PO_3 and the top conductive pattern M1_1 are electrically connected through the conductive vias VG_1, VG_3, VG_5, and V0_1, and a middle conductive pattern (not shown) extending along an x-axis. The poly-material patterns PO_1, PO_2, and PO_3 and the top conductive pattern M1_1 are electrically connected through the conductive vias VG_2, VG_4, VG_6, and V0_2, and a middle conductive pattern (not shown) extending along an x-axis.

The parallel connections of the poly-material patterns PO_1, PO_2, and PO_3 and the top conductive pattern M1_1 can reduce the overall resistance of the layout 300. The parallel connections of the poly-material patterns PO_1, PO_2, and PO_3 and the top conductive pattern M1_1 can increase the operating speed of a semiconductor device manufactured in accordance with the layout 300.

Figure 4B:
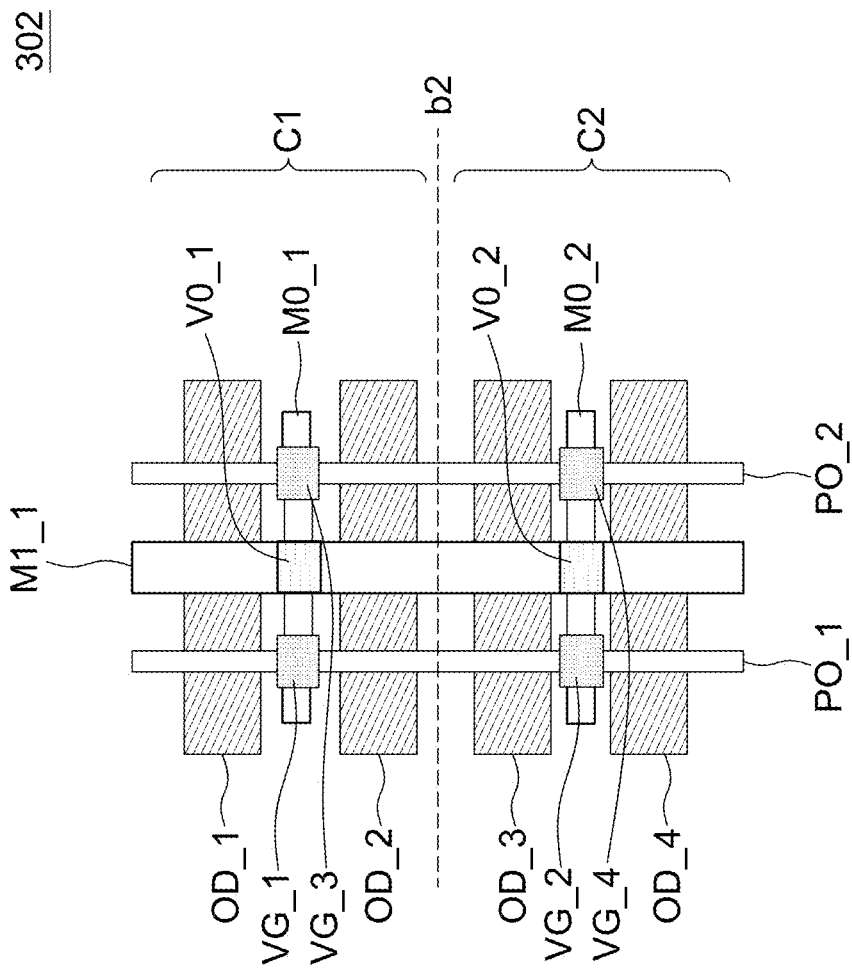
FIG. 4B is a top view of a semiconductor layout, in accordance with some embodiments of the present disclosure.

FIG. 4B illustrates a top view of a semiconductor layout, in accordance with some embodiments of the present disclosure.

FIG. 4B shows a layout 302. The layout 302 is a non-limiting example of a portion of the layout 300 of FIG. 4A. The layout 302 is a simplified schematic to show the electrical connections between the poly-material pattern and the top conductive pattern.

The layout 302 includes active regions OD_1, OD_2, OD_3 and OD_4 extending along an x-axis, a top conductive pattern M1_1 extending along a y-axis, poly-material patterns PO_1 and PO_2 extending along a y-axis, and middle conductive patterns (e.g., M0_1, and M0_2) extending along an x-axis.

The poly-material pattern PO_1 extends continuously from the cell C1 to the cell C2, across the boundary b2 between the cells C1 and C2. The top conductive pattern M1_1 extends continuously from the cell C1 to the cell C2, across the boundary b2 between the cells C1 and C2.

The poly-material patterns PO_1 and PO_2 are electrically connected in parallel with the top conductive pattern M1_1. The poly-material patterns PO_1 and PO_2 are electrically connected to the top conductive pattern M1_1, through the conductive vias VG_1, V0_1 and VG_3 and the middle conductive pattern M0_1. The poly-material patterns PO_1 and PO_2 are electrically connected to the top conductive pattern M1_1, through the conductive vias VG_2, V0_2 and VG_4 and the middle conductive pattern M0_2.

In FIG. 4B, two active regions OD_2 and OD_3 are located between the conductive vias VG_1 and VG_2 (or between the middle conductive patterns M0_1 and M0_2). In some embodiments, more than two active regions are between the conductive vias VG_1 and VG_2. In other embodiments, only one active region is located between the conductive vias VG_1 and VG_2.

Figure 5A:
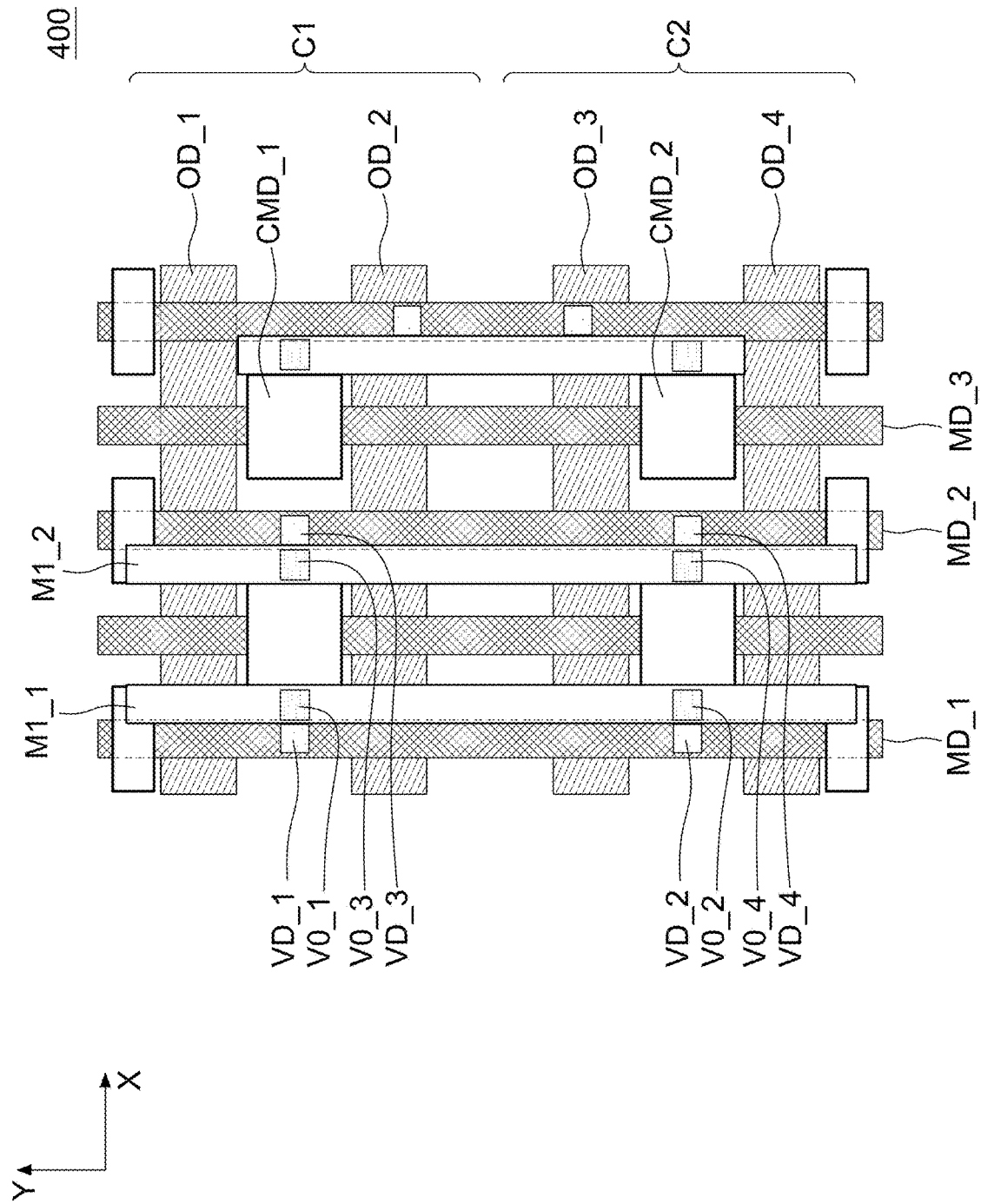
FIG. 5A is a top view of a semiconductor layout, in accordance with some embodiments of the present disclosure.

FIG. 5A illustrates a top view of a semiconductor layout, in accordance with some embodiments of the present disclosure.

FIG. 5A shows a layout 400. The layout 400 can correspond to an electrical device. The layout 400 can correspond to a semiconductor device. The layout 400 can correspond to a logic semiconductor structure. The layout 400 can correspond to a system of integrated circuits (IC).

The layout 400 includes active regions OD_1, OD_2, OD_3 and OD_4 extending along an x-axis, a plurality of bottom conductive patterns (e.g., MD_1, MD_2, and MD_3) extending along a y-axis, a plurality of poly-material patterns (not shown) extending along a y-axis, a plurality of middle conductive patterns (not shown) extending along an x-axis, and a plurality of top conductive patterns (e.g., M1_1 and M1_2) extending along a y-axis.

The layout 400 includes regions for cells C1 and C2. Cells C1 and C2 can each have a region with "single height," and the layout 400 can be referred to as a layout with a region of "double height."

The layout 400 includes isolation structures for separating a bottom conductive pattern into segments that are electrically isolated. For example, the isolation structures CMD_1 and CMD_2 can separate the bottom conductive pattern MD_3 into segments that are electrically isolated.

In the layout 400 of FIG. 5A, the bottom conductive patterns MD_1 and MD_2 are not divided by any isolation structure. The bottom conductive patterns MD_1 and MD_2 extend continuously from the cell C1 to the cell C2, across the boundary between the cell C1 to the cell C2.

The bottom conductive patterns MD_1 and MD_2 are electrically connected in parallel. The bottom conductive patterns MD_1 and MD_2 are electrically connected in parallel with the top conductive patterns M1_1 and M1_2.

The bottom conductive patterns MD_1 and MD_2 and the top conductive patterns M1_1 and M1_2 are electrically connected through the conductive vias VD_1, V0_1, V0_3, and VD_3, and a middle conductive pattern (not shown) extending along an x-axis. The bottom conductive patterns MD_1 and MD_2 and the top conductive patterns M1_1 and M1_2 are electrically connected through the conductive vias VD_2, V0_2, V0_4, and VD_4, and a middle conductive pattern (not shown) extending along an x-axis.

The parallel connections of the bottom conductive patterns MD_1 and MD_2 and the top conductive patterns M1_1 and M1_2 can reduce the overall resistance of the layout 400. The parallel connections of the bottom conductive patterns MD_1 and MD_2 and the top conductive patterns M1_1 and M1_2 can increase the operating speed of a semiconductor device manufactured in accordance with the layout 400.

Figure 5B:
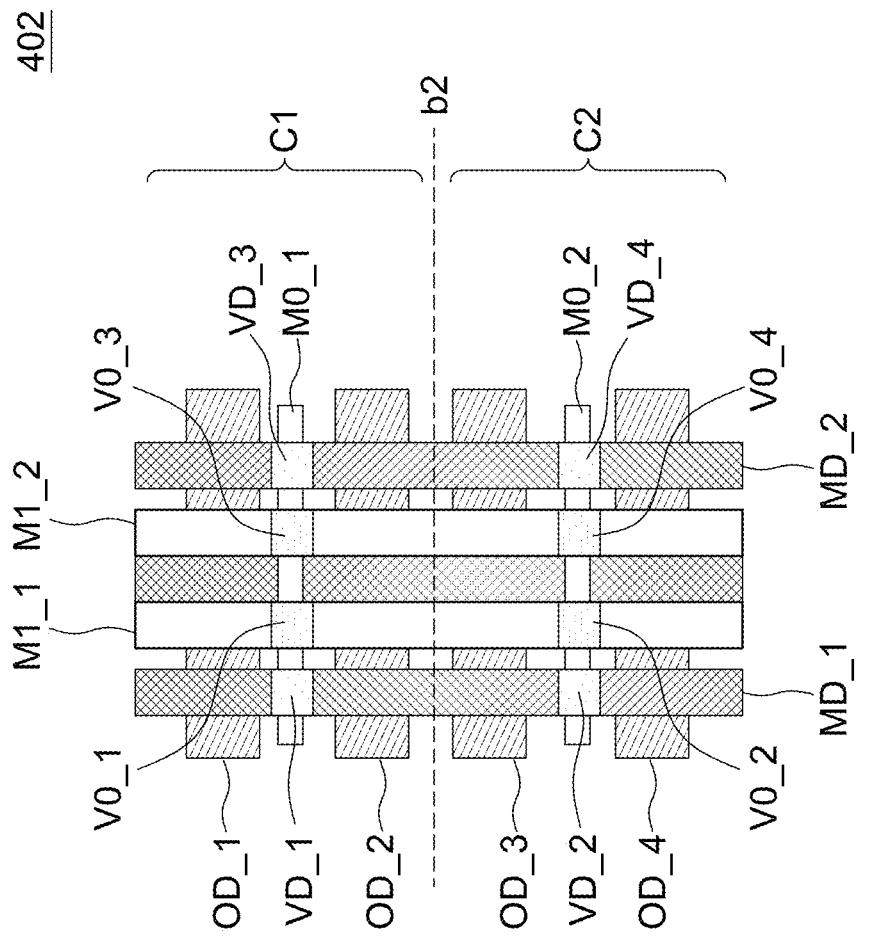
FIG. 5B is a top view of a semiconductor layout, in accordance with some embodiments of the present disclosure.

FIG. 5B illustrates a top view of a semiconductor layout, in accordance with some embodiments of the present disclosure.

FIG. 5B shows a layout 402. The layout 402 is a non-limiting example of a portion of the layout 400 of FIG. 5A. The layout 402 is a simplified schematic to show the electrical connections between the bottom conductive patterns and the top conductive patterns.

The layout 402 includes active regions OD_1, OD_2, OD_3 and OD_4 extending along an x-axis, top conductive patterns M1_1 and M1_2 extending along a y-axis, middle conductive patterns M0_1 and M0_2 extending along an x-axis, and bottom conductive patterns MD_1 and MD_2 extending along a y-axis.

The bottom conductive patterns MD_1 and MD_2 extend continuously from the cell C1 to the cell C2, across the boundary b2 between the cells C1 and C2. The top conductive patterns M1_1 and M1_2 extend continuously from the cell C1 to the cell C2, across the boundary b2 between the cells C1 and C2.

The bottom conductive patterns MD_1 and MD_2 are electrically connected in parallel with the top conductive patterns M1_1 and M1_2. The bottom conductive patterns MD_1 and MD_2 are electrically connected to the top conductive patterns M1_1 and M1_2, through the conductive vias VD_1, V0_1, V0_3, and VD_3 and the middle conductive pattern M0_1. The bottom conductive patterns MD_1 and MD_2 are electrically connected to the top conductive patterns M1_1 and M1_2, through the conductive vias VD_2, V0_2, V0_4, and VD_4 and the middle conductive pattern M0_2.

In FIG. 5B, two active regions OD_2 and OD_3 are located between the conductive vias VD_1 and VD_2 (or between the middle conductive patterns M0_1 and M0_2). In some embodiments, more than two active regions are between the conductive vias VD_1 and VD_2. In other embodiments, only one active region is located between the conductive vias VD_1 and VD_2.

Figure 6:
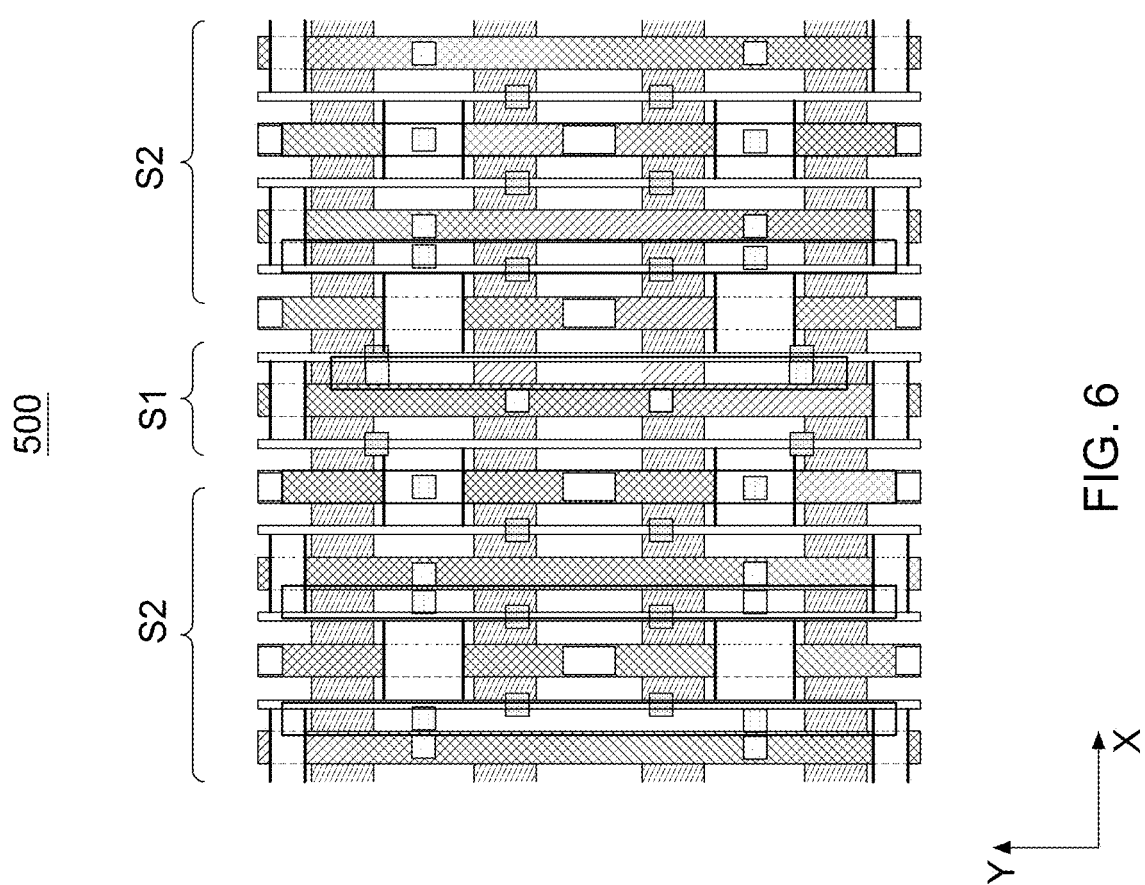
FIG. 6 is a top view of a semiconductor layout, in accordance with some embodiments of the present disclosure.

FIG. 6 illustrates a top view of a semiconductor layout, in accordance with some embodiments of the present disclosure.

FIG. 6 shows a layout 500. The layout 500 includes a plurality of active regions extending along an x-axis, a plurality of bottom conductive patterns extending along a y-axis, a plurality of poly-material patterns extending along a y-axis, a plurality of middle conductive patterns extending along an x-axis (not shown), and a plurality of top conductive patterns extending along a y-axis.

In the layout 500, an input stage S1 is located at the center of the layout while output stages S2 are located adjacent the input stage S1. Compared to approaches including a single input stage and a single output stage, signals transmitting from the input stage S1 will propagate along a shorter distance before they can arrive at the output stages S2. Thus, the manner in which the stages S1 and S2 is arranged in the layout 500 is better-balanced and can result in a semiconductor device with better performance.

Figure 7:
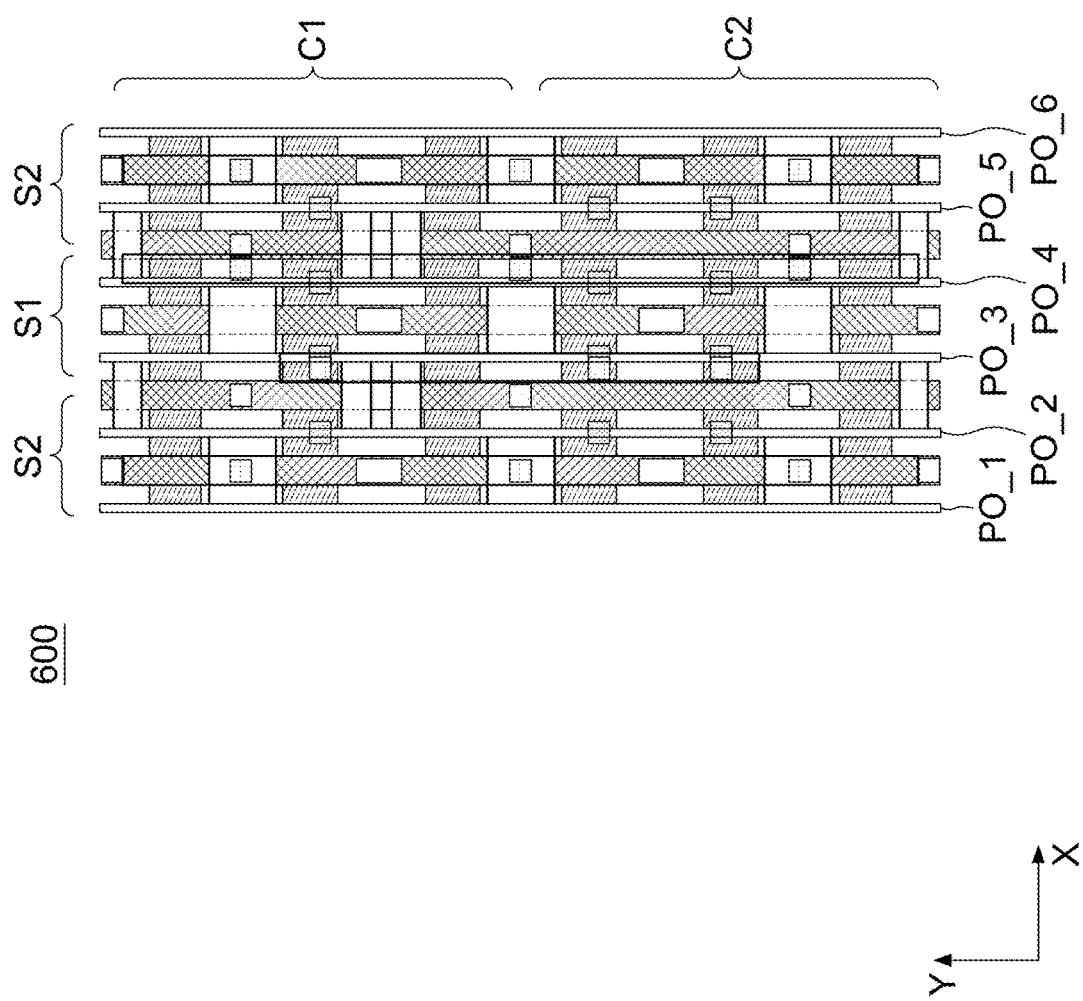
FIG. 7 is a top view of a semiconductor layout, in accordance with some embodiments of the present disclosure.

FIG. 7 illustrates a top view of a semiconductor layout, in accordance with some embodiments of the present disclosure.

FIG. 7 shows a layout 600. The layout 600 includes a plurality of active regions extending along an x-axis, a plurality of bottom conductive patterns extending along a y-axis, a plurality of poly-material patterns (e.g., PO_1, PO_2, PO_3, PO_4, PO_5, and PO_6) extending along a y-axis, a plurality of middle conductive patterns extending along an x-axis (not shown), and a plurality of top conductive patterns extending along a y-axis.

In the layout 600, the input stage S1 is located at the center of the layout while the output stages S2 are located adjacent the input stage S1. Compared to approaches including a large number (e.g., six or more) of poly-material patterns, the number of the poly-material patterns is relatively small such that the signals transmitting from the input stage S1 can propagate along a shorter distance before they can arrive at the output stage S2.

Furthermore, the middle conductive patterns (not shown) extending along an x-axis are relatively short, and as a result the layout 600 may exhibit relatively smaller resistance.

In some embodiments, if the number of the poly-material patterns within a semiconductor layout equals or exceeds six, it is preferred to design such semiconductor layout using a "double height" scheme (i.e., using the layout 600 shown in FIG. 7 having regions for cells C1 and C2).

Figure 8A:
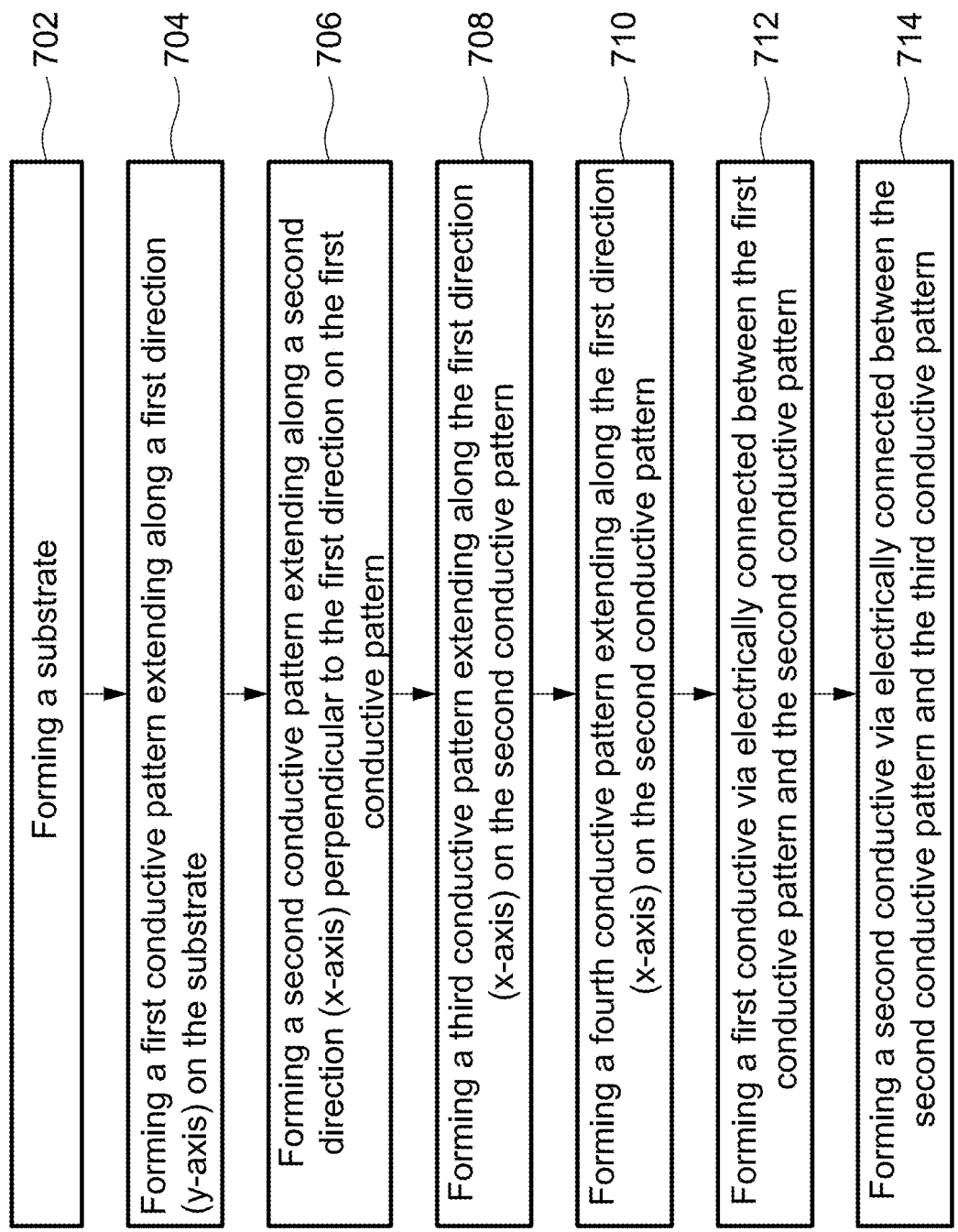
FIGS. 8A and 8B are flowcharts of operations for manufacturing a semiconductor device, in accordance with some embodiments of the present disclosure.
Figure 8B:
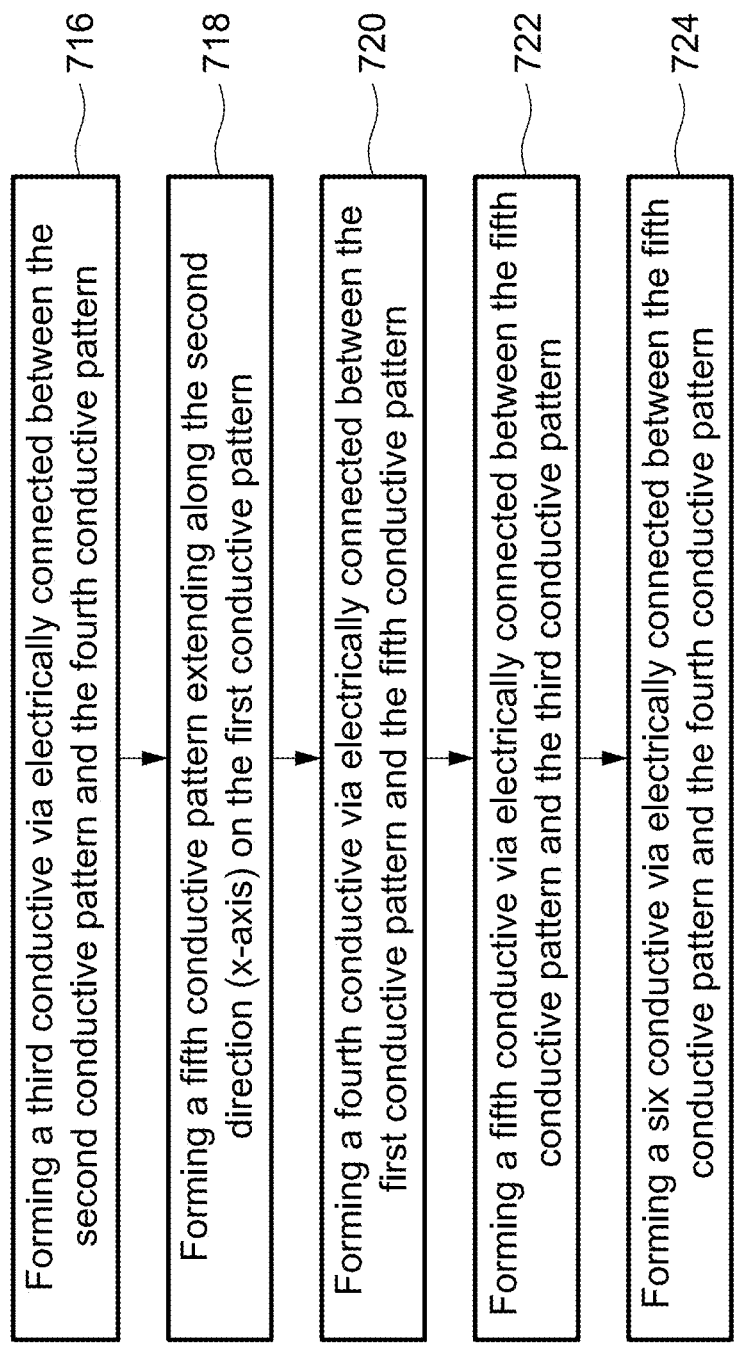

FIGS. 8A and 8B illustrate a flow chart including operations for manufacturing a semiconductor device, in accordance with some embodiments of the present disclosure.

FIGS. 8A and 8B include operations 702, 704, 706, 708, 710, 712, 714, 716, 718, 720, 722 and 724 for manufacturing a semiconductor device. Although the operations 702, 704, 706, 708, 710, 712, 714, 716, 718, 720, 722 and 724 are depicted in sequence in FIGS. 8A and 8B, it can be contemplated that the operations 702, 704, 706, 708, 710, 712, 714, 716, 718, 720, 722 and 724 can be performed in an order other than that shown in FIGS. 8A and 8B. In some embodiments, performing some or all of the operations of the operations 702-724 includes performing one or more operations as discussed below with respect to IC manufacturing system 1100 and FIG. 11.

In the operation 702, in some embodiments, a substrate is formed. The substrate formed in the operation 702 may include, for example, but is not limited to, silicon (S1), doped S1, silicon carbide (SiC), germanium silicide (SiGe), gallium arsenide (GaAs), or other semiconductor materials. The substrate formed in the operation 702 may include, for example, but is not limited to, sapphire, silicon on insulator (SOI), or other suitable materials. In some embodiments, the substrate formed in the operation 702 includes a silicon material. In some embodiments, the substrate formed in the operation 702 is a silicon substrate.

In the operation 704, in some embodiments, a first conductive pattern extending along a first direction (y-axis) is formed on the substrate. The first conductive pattern formed in the operation 704 can correspond to the bottom conductive pattern MD_2 of FIG. 1A.

In the operation 706, in some embodiments, a second conductive pattern extending along a second direction (x-axis) perpendicular to the first direction is formed on the first conductive pattern. The second conductive pattern formed in the operation 706 can correspond to the middle conductive pattern M0_1 of FIG. 1A.

In the operation 708, in some embodiments, a third conductive pattern (FIG. 1A: M1_2) extending along the first direction (x-axis) is formed on the second conductive pattern. The third conductive pattern formed in the operation 708 can correspond to the top conductive pattern M1_2 of FIG. 1A.

In the operation 710, in some embodiments, a fourth conductive pattern (FIG. 1A: M1_3) extending along the first direction (x-axis) is formed on the second conductive pattern. The fourth conductive pattern formed in the operation 710 can correspond to the top conductive pattern M1_3 of FIG. 1A.

In the operation 712, in some embodiments, a first conductive via electrically connected between the first conductive pattern and the second conductive pattern is formed. The first conductive via formed in the operation 712 can correspond to the conductive via VD_1 of FIG. 1A. Referring to FIG. 1A, the conductive via VD_1 electrically connects the bottom conductive pattern MD_2 to the middle conductive pattern M0_1.

In the operation 714, in some embodiments, a second conductive via electrically connected between the second conductive pattern and the third conductive pattern is formed. The second conductive via formed in the operation 714 can correspond to the conductive via V0_3 of FIG. 1A. Referring to FIG. 1A, the conductive via V0_3 electrically connects the middle conductive pattern M0_1 to the top conductive pattern M1_2.

In the operation 716, in some embodiments, a third conductive via electrically connected between the second conductive pattern and the fourth conductive pattern is formed. The third conductive via formed in the operation 716 can correspond to the conductive via V0_5 of FIG. 1A. Referring to FIG. 1A, the conductive via V0_5 electrically connects the middle conductive pattern M0_1 to the top conductive pattern M1_3.

In the operation 718, in some embodiments, a fifth conductive pattern (FIG. 1A: M0_5) extending along the second direction (x-axis) is formed on the first conductive pattern. The fifth conductive pattern formed in the operation 718 can correspond to the middle conductive pattern M0_5 of FIG. 1A.

In the operation 720, in some embodiments, a fourth conductive via electrically connected between the first conductive pattern and the fifth conductive pattern is formed. The fourth conductive via formed in the operation 720 can correspond to the conductive via VD_2 of FIG. 1A. Referring to FIG. 1A, the conductive via VD_2 electrically connects the bottom conductive pattern MD_2 to the middle conductive pattern M0_5.

In the operation 722, in some embodiments, a fifth conductive via electrically connected between the fifth conductive pattern and the third conductive pattern is formed. The fifth conductive via formed in the operation 722 can correspond to the conductive via V0_4 of FIG. 1A. Referring to FIG. 1A, the conductive via V0_4 electrically connects the middle conductive pattern M0_5 to the top conductive pattern M1_2.

In the operation 724, in some embodiments, a sixth conductive via electrically connected between the fifth conductive pattern and the fourth conductive pattern is formed. The sixth conductive via formed in the operation 724 can correspond to the conductive via V0_6 of FIG. 1A. Referring to FIG. 1A, the conductive via V0_6 electrically connects the middle conductive pattern M0_5 to the top conductive pattern M1_3.

Figure 9:
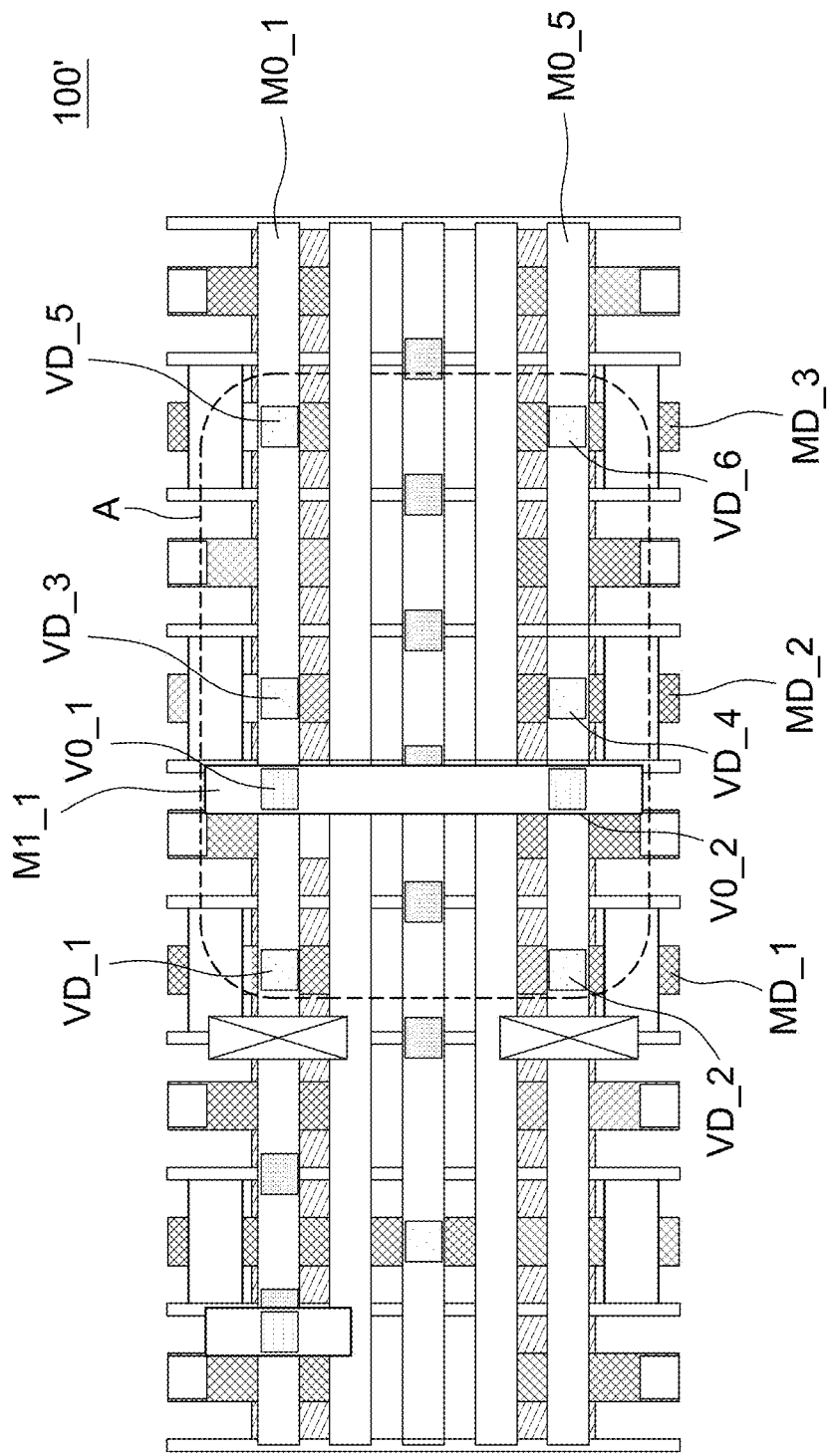
FIG. 9 is a top view of a semiconductor layout, in accordance with some comparative embodiments of the present disclosure.

FIG. 9 illustrates a top view of a semiconductor layout, in accordance with some comparative embodiments of the present disclosure.

FIG. 9 shows a layout 100'. The layout 100' includes a plurality of active regions extending along an x-axis, a plurality of bottom conductive patterns (e.g., MD_1, MD_2, and MD_3) extending along a y-axis, a plurality of poly-material patterns extending along a y-axis, a plurality of middle conductive patterns extending along an x-axis (e.g., M0_1 and M0_2), and a plurality of top conductive patterns extending along a y-axis (e.g., M1_1).

Referring to the dotted block A shown in FIG. 9, in the output stage of the layout 100,' merely one top conductive pattern M1_1 is electrically connected in parallel with the bottom conductive patterns MD_1, MD_2, and MD_3. As a result, the layout 100' of FIG. 9 exhibits a higher resistance than the layout 100 shown in FIG. 1A.

The top conductive pattern M1_1 is electrically connected to the bottom conductive patterns MD_1, MD_2, and MD_3 through the conductive vias V0_1, VD_1, VD_3, and VD_5, and the middle conductive pattern M0_1. Furthermore, the top conductive pattern M1_1 is electrically connected to the bottom conductive patterns MD_1, MD_2, and MD_3 through the conductive vias V0_2, VD_2, VD_4, and VD_6, and the middle conductive pattern M0_5.

Figure 10:
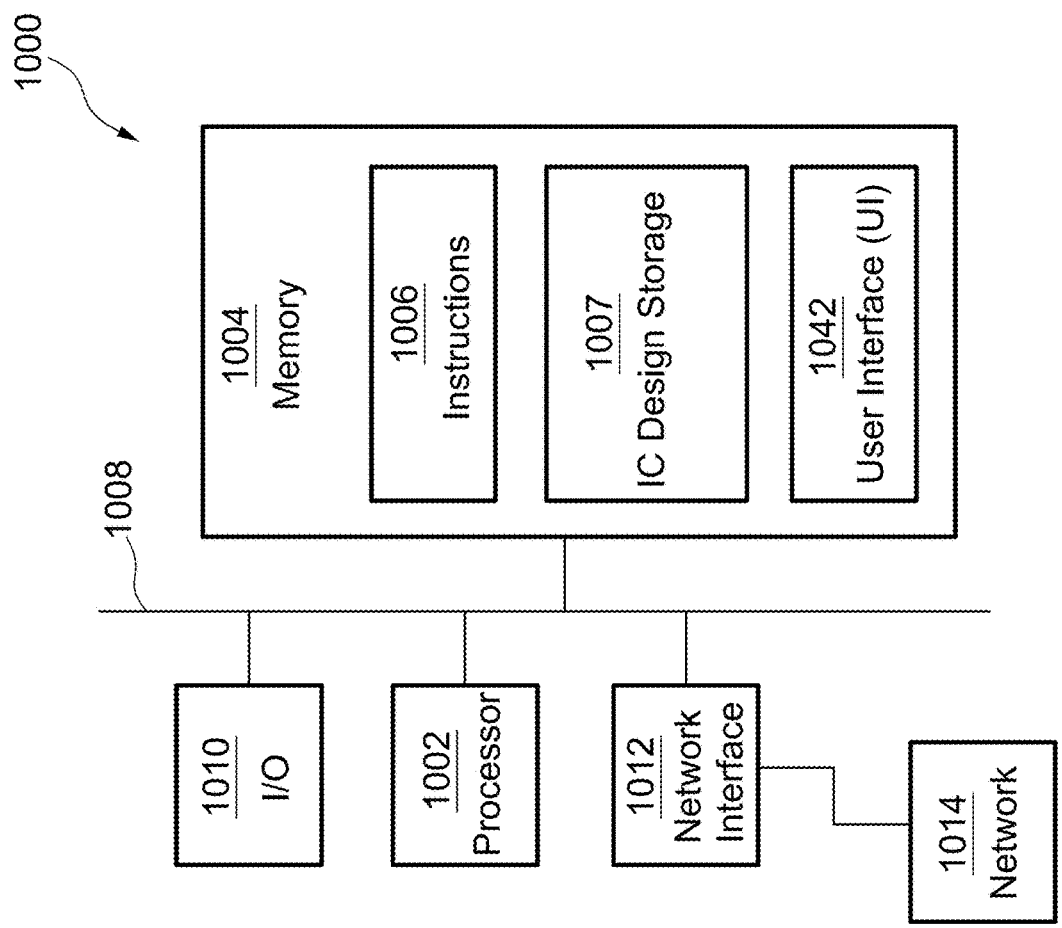
FIG. 10 is a block diagram of an IC layout diagram generation system, in accordance with some embodiments.

FIG. 10 is a block diagram of IC design system 1000, in accordance with some embodiments. Methods described herein of designing IC layout diagrams in accordance with one or more embodiments are implementable, for example, using IC design system 1000, in accordance with some embodiments. In some embodiments, IC design system 1000 is an APR system, includes an APR system, or is part of an APR system, usable for performing an APR method.

In some embodiments, IC design system 1000 is a general purpose computing device including a hardware processor 1002 and non-transitory, computer-readable storage medium 1004. Storage medium 1004, amongst other things, is encoded with, i.e., stores, computer program code 1006, i.e., a set of executable instructions. Execution of instructions 1006 by hardware processor 1002 represents (at least in part) an EDA tool which implements a portion or all of a method, e.g., a method of generating an IC layout diagram described above (hereinafter, the noted processes and/or methods).

Processor 1002 is electrically coupled to computer-readable storage medium 1004 via a bus 1008. Processor 1002 is also electrically coupled to an I/O interface 1010 by bus 1008. Network interface 1012 is also electrically connected to processor 1002 via bus 1008. Network interface 1012 is connected to a network 1014, so that processor 1002 and computer-readable storage medium 1004 are capable of connecting to external elements via network 1014. Processor 1002 is configured to execute computer program code 1006 encoded in computer-readable storage medium 1004 in order to cause IC design system 1000 to be usable for performing a portion or all of the noted processes and/or methods. In one or more embodiments, processor 1002 is a central processing unit (CPU), a multi-processor, a distributed processing system, an application specific integrated circuit (ASIC), and/or a suitable processing unit.

In one or more embodiments, computer-readable storage medium 1004 is an electronic, magnetic, optical, electromagnetic, infrared, and/or a semiconductor system (or apparatus or device). For example, computer-readable storage medium 1004 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 1004 includes a compact disk-read only memory (CD-ROM), a compact disk-read/write (CD-R/W), and/or a digital video disc (DVD).

In one or more embodiments, storage medium 1004 stores computer program code 1006 configured to cause IC design system 1000 (where such execution represents (at least in part) the EDA tool) to be usable for performing a portion or all of the noted processes and/or methods. In one or more embodiments, storage medium 1004 also stores information which facilitates performing a portion or all of the noted processes and/or methods. In one or more embodiments, storage medium 1004 includes IC design storage 1007 configured to store one or more IC layout diagrams, e.g., an IC layout diagram discussed above with respect to FIGS. 1A-7 and 9.

IC design system 1000 includes I/O interface 1010. I/O interface 1010 is coupled to external circuitry. In one or more embodiments, I/O interface 1010 includes a keyboard, keypad, mouse, trackball, trackpad, touchscreen, and/or cursor direction keys for communicating information and commands to processor 1002.

IC design system 1000 also includes network interface 1012 coupled to processor 1002. Network interface 1012 allows IC design system 1000 to communicate with network 1014, to which one or more other computer systems are connected. Network interface 1012 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more IC design systems 1000.

IC design system 1000 is configured to receive information through I/O interface 1010. The information received through I/O interface 1010 includes one or more of instructions, data, design rules, libraries of standard cells, and/or other parameters for processing by processor 1002. The information is transferred to processor 1002 via bus 1008. IC design system 1000 is configured to receive information related to a UI through I/O interface 1010. The information is stored in computer-readable medium 1004 as user interface (UI) 1042.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by IC design system 1000. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 11:
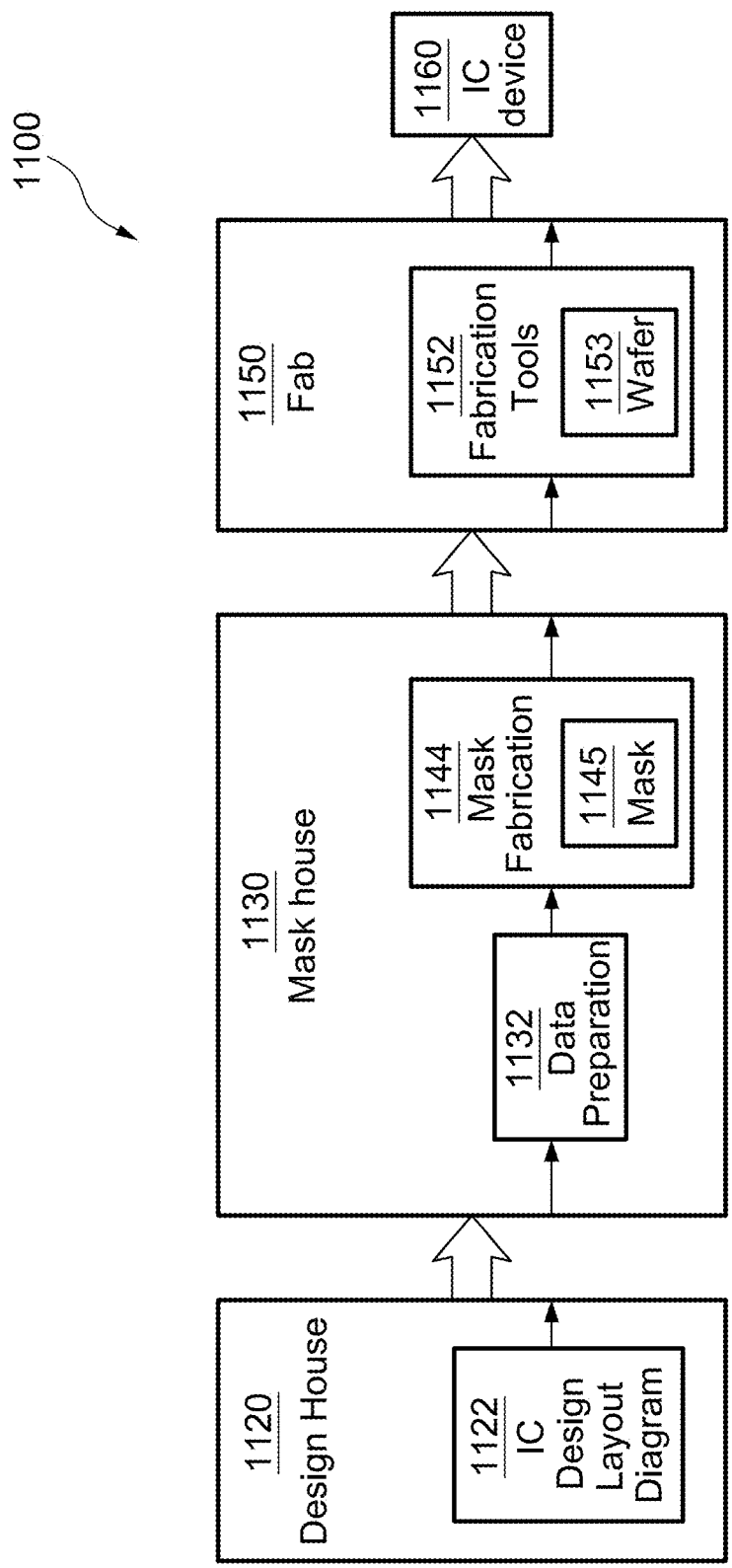
FIG. 11 is a block diagram of an IC manufacturing system, and an IC manufacturing flow associated therewith, in accordance with some embodiments.

FIG. 11 is a block diagram of IC manufacturing system 1100, and an IC manufacturing flow associated therewith, in accordance with some embodiments. In some embodiments, based on an IC layout diagram, at least one of (A) one or more semiconductor masks or (B) at least one component in a layer of a semiconductor integrated circuit is fabricated using manufacturing system 1100.

In FIG. 11, IC manufacturing system 1100 includes entities, such as a design house 1120, a mask house 1130, and an IC manufacturer/fabricator ("fab") 1150, that interact with one another in the design, development, and manufacturing cycles and/or services related to manufacturing an IC device 1160. The entities in system 1100 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1120, mask house 1130, and IC fab 1150 is owned by a single larger company. In some embodiments, two or more of design house 1120, mask house 1130, and IC fab 1150 coexist in a common facility and use common resources.

Design house (or design team) 1120 generates an IC design layout diagram 1122. IC design layout diagram 1122 includes various geometrical patterns, e.g., an IC layout diagram discussed above. The geometrical patterns correspond to patterns of metal, oxide, or semiconductor layers that make up the various components of IC device 1160 to be fabricated. The various layers combine to form various IC features. For example, a portion of IC design layout diagram 1122 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1120 implements a proper design procedure to form IC design layout diagram 1122. The design procedure includes one or more of logic design, physical design or place and route. IC design layout diagram 1122 is presented in one or more data files having information of the geometrical patterns. For example, IC design layout diagram 1122 can be expressed in a GDSII file format or DFII file format.

Mask house 1130 includes data preparation 1132 and mask fabrication 1144. Mask house 1130 uses IC design layout diagram 1122 to manufacture one or more masks 1145 to be used for fabricating the various layers of IC device 1160 according to IC design layout diagram 1122. Mask house 1130 performs mask data preparation 1132, where IC design layout diagram 1122 is translated into a representative data file (RDF). Mask data preparation 1132 provides the RDF to mask fabrication 1144. Mask fabrication 1144 includes a mask writer. A mask writer converts the RDF to an image on a substrate, such as mask (reticle) 1145 or a semiconductor wafer 1153. The design layout diagram 1122 is manipulated by mask data preparation 1132 to comply with particular characteristics of the mask writer and/or requirements of IC fab 1150. In FIG. 11, mask data preparation 1132 and mask fabrication 1144 are illustrated as separate elements. In some embodiments, mask data preparation 1132 and mask fabrication 1144 can be collectively referred to as mask data preparation.

In some embodiments, mask data preparation 1132 includes optical proximity correction (OPC) which uses lithography enhancement techniques to compensate for image errors, such as those that can arise from diffraction, interference, other process effects and the like. OPC adjusts IC design layout diagram 1122. In some embodiments, mask data preparation 1132 includes further resolution enhancement techniques (RET), such as off-axis illumination, subresolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1132 includes a mask rule checker (MRC) that checks the IC design layout diagram 1122 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1122 to compensate for limitations during mask fabrication 1144, which may undo part of the modifications performed by OPC in order to meet mask creation rules.

In some embodiments, mask data preparation 1132 includes lithography process checking (LPC) that simulates processing that will be implemented by IC fab 1150 to fabricate IC device 1160. LPC simulates this processing based on IC design layout diagram 1122 to create a simulated manufactured device, such as IC device 1160. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1122.

It should be understood that the above description of mask data preparation 1132 has been simplified for the purposes of clarity. In some embodiments, data preparation 1132 includes additional features such as a logic operation (LOP) to modify the IC design layout diagram 1122 according to manufacturing rules. Additionally, the processes applied to IC design layout diagram 1122 during data preparation 1132 may be executed in a variety of different orders.

After mask data preparation 1132 and during mask fabrication 1144, a mask 1145 or a group of masks 1145 are fabricated based on the modified IC design layout diagram 1122. In some embodiments, mask fabrication 1144 includes performing one or more lithographic exposures based on IC design layout diagram 1122. In some embodiments, an electron-beam (e-beam) or a mechanism of multiple e-beams is used to form a pattern on a mask (photomask or reticle) 1145 based on the modified IC design layout diagram 1122. Mask 1145 can be formed in various technologies. In some embodiments, mask 1145 is formed using binary technology. In some embodiments, a mask pattern includes opaque regions and transparent regions. A radiation beam, such as an ultraviolet (UV) or EUV beam, used to expose the image sensitive material layer (e.g., photoresist) which has been coated on a wafer, is blocked by the opaque region and transmits through the transparent regions. In one example, a binary mask version of mask 1145 includes a transparent substrate (e.g., fused quartz) and an opaque material (e.g., chromium) coated in the opaque regions of the binary mask. In another example, mask 1145 is formed using a phase shift technology. In a phase shift mask (PSM) version of mask 1145, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1144 is used in a variety of processes. For example, such a mask(s) is used in an ion implantation process to form various doped regions in semiconductor wafer 1153, in an etching process to form various etching regions in semiconductor wafer 1153, and/or in other suitable processes.

IC fab 1150 is an IC fabrication business that includes one or more manufacturing facilities for the fabrication of a variety of different IC products. In some embodiments, IC Fab 1150 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1150 includes wafer fabrication tools 1152 configured to execute various manufacturing operations on semiconductor wafer 1153 such that IC device 1160 is fabricated in accordance with the mask(s), e.g., mask 1145. In various embodiments, fabrication tools 1152 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 1150 uses mask(s) 1145 fabricated by mask house 1130 to fabricate IC device 1160. Thus, IC fab 1150 at least indirectly uses IC design layout diagram 1122 to fabricate IC device 1160. In some embodiments, semiconductor wafer 1153 is fabricated by IC fab 1150 using mask(s) 1145 to form IC device 1160. In some embodiments, the IC fabrication includes performing one or more lithographic exposures based at least indirectly on IC design layout diagram 1122. Semiconductor wafer 1153 includes a silicon substrate or other proper substrate having material layers formed thereon. Semiconductor wafer 1153 further includes one or more of various doped regions, dielectric features, multi-level interconnects, and the like (formed at subsequent manufacturing steps).

Details regarding an IC manufacturing system (e.g., system 1100 of FIG. 11), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

Some embodiments of the present disclosure provide a semiconductor device. The semiconductor device comprises a first conductive pattern on a substrate and extending along a first direction, a second conductive pattern above the first conductive pattern and extending along the first direction, and a third conductive pattern above the first conductive pattern and extending along the first direction. The first conductive pattern is electrically connected in parallel with the second conductive pattern and the third conductive pattern.

Some embodiments of the present disclosure provide a semiconductor device. The semiconductor device comprises a first gate electrode on a substrate and extending along a first direction, and a first conductive pattern on the substrate and extending along the first direction. Wherein the first gate electrode is electrically connected in parallel with the first conductive pattern. The first gate electrode extends continuously from a first cell region to a second cell region.

Some embodiments of the present disclosure provide a method for manufacturing a semiconductor device. The method comprises forming a first conductive pattern extending along a first direction on a substrate. The method comprises forming a second conductive pattern extending along a second direction perpendicular to the first direction on the first conductive pattern. The method comprises forming a third conductive pattern extending along the first direction on the second conductive pattern. The method comprises forming a fourth conductive pattern extending along the first direction on the second conductive pattern. The method comprises forming a first conductive via electrically connected between the first conductive pattern and the second conductive pattern. The method comprises forming a second conductive via electrically connected between the second conductive pattern and the third conductive pattern. The method comprises forming a third conductive via electrically connected between the second conductive pattern and the fourth conductive pattern.

The foregoing outlines structures of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device comprising:
    a first conductive pattern on a substrate and extending along a first direction;
    a second conductive pattern above the first conductive pattern and extending along the first direction;
    a third conductive pattern above the first conductive pattern and extending along the first direction;
    a fourth conductive pattern between the first conductive pattern and the second and third conductive patterns and extending along a second direction perpendicular to the first direction; and
    a fifth conductive pattern between the first conductive pattern and the second and third conductive patterns and extending along the second direction; wherein
    the first conductive pattern is electrically connected in parallel with the second conductive pattern and the third conductive pattern between the fourth and fifth conductive patterns.

2. The semiconductor device of claim 1,
    wherein the first conductive pattern is electrically connected to the second conductive pattern through a first conductive via, the fourth conductive pattern, and a second conductive via.

3. The semiconductor device of claim 2, wherein the first conductive pattern is further electrically connected to the second conductive pattern through a third conductive via, the fifth conductive pattern, and a fourth conductive via.

4. The semiconductor device of claim 3, further comprising:
    a first active region extending along the second direction; and
    a second active region extending along the second direction, wherein
    the first active region and the second active region are between the first conductive via and the third conductive via.

5. The semiconductor device of claim 1,
    wherein the first conductive pattern is electrically connected to the third conductive pattern through a first conductive via, the fourth conductive pattern, and a second conductive via.

6. The semiconductor device of claim 5, wherein the first conductive pattern is further electrically connected to the third conductive pattern through a third conductive via, the fifth conductive pattern, and a fourth conductive via.

7. The semiconductor device of claim 1, wherein the second conductive pattern is above the first conductive pattern, and wherein an edge of the first conductive pattern is substantially aligned with an edge of the second conductive pattern.

8. The semiconductor device of claim 1, wherein the first conductive pattern is between the second conductive pattern and the third conductive pattern, and wherein the first conductive pattern is spaced apart from the second conductive pattern and the third conductive pattern.

9. The semiconductor device of claim 1, further comprising:
    a poly-material pattern on the substrate and extending along the first direction; wherein
    a first portion of the second conductive pattern overlaps a portion of the poly-material pattern in a second direction perpendicular to the first direction, and
    a second portion of the second conductive pattern overlaps with the first conductive pattern in the second direction.

10. The semiconductor device of claim 1, wherein the first conductive pattern extends continuously from a first cell region to a second cell region, and wherein the second conductive pattern extends continuously from the first cell region to the second cell region.

11. The semiconductor device of claim 1, further comprising:
    a first region configured to receive a first input signal;
    a second region configured to provide a first output signal; and
    a third region configured to provide a second output signal, wherein
    the first region is between the second region and the third region.

12. A semiconductor device comprising:
    a first gate electrode on a substrate and extending along a first direction;
    a first conductive pattern on the substrate and extending along the first direction; and
    a second conductive pattern on the substrate and extending along a second direction perpendicular to the first direction; wherein
    the first gate electrode is electrically connected in parallel with the first conductive pattern,
    the first gate electrode extends continuously from a first cell region to a second cell region, and
    the first gate electrode is electrically connected to the first conductive pattern through a first conductive via, the second conductive pattern, and a second conductive via.

13. The semiconductor device of claim 12, wherein each of the first gate electrode and the first conductive pattern extends across a first active region in the first cell region and a second active region in the second cell region.

14. The semiconductor device of claim 12, further comprising:
a third conductive pattern on the substrate and extending along the second direction; wherein
the first gate electrode is further electrically connected to the first conductive pattern through a third conductive via, the third conductive pattern, and a fourth conductive via.

15. The semiconductor device of claim 12, wherein the first gate electrode and the first conductive pattern are on and in contact with the substrate.

16. The semiconductor device of claim 12, wherein the first gate electrode is between the substrate and the first conductive pattern.

17. The semiconductor device of claim 12, further comprising a second gate electrode extending along the first direction, wherein the second gate electrode is electrically connected in parallel with the first conductive pattern and the first gate electrode.

18. A method for manufacturing a semiconductor device, comprising:
forming a first conductive pattern extending along a first direction on a substrate;
forming a second conductive pattern extending along a second direction perpendicular to the first direction on the first conductive pattern;
forming a third conductive pattern extending along the first direction on the second conductive pattern;
forming a fourth conductive pattern extending along the first direction on the second conductive pattern;
forming a first conductive via electrically connected between the first conductive pattern and the second conductive pattern;
forming a second conductive via electrically connected between the second conductive pattern and the third conductive pattern;
forming a third conductive via electrically connected between the second conductive pattern and the fourth conductive pattern;
forming a fifth conductive pattern extending along the second direction on the first conductive pattern; and
forming a fourth conductive via electrically connected between the first conductive pattern and the fifth conductive pattern.

19. The method of claim 18, further comprising:
forming a fifth conductive via electrically connected between the fifth conductive pattern and the third conductive pattern; and
forming a sixth conductive via electrically connected between the fifth conductive pattern and the fourth conductive pattern.

20. The method of claim 18, wherein the forming the third conductive pattern comprises aligning an edge of the third conductive pattern with an edge of the first conductive pattern.

* * * * *